(12) United States Patent
Liu et al.

(10) Patent No.: US 11,600,172 B2
(45) Date of Patent: Mar. 7, 2023

(54) INTERNET OF VEHICLES MESSAGE EXCHANGE METHOD AND RELATED APPARATUS

(71) Applicant: Huawei Cloud Computing Technologies Co., Ltd., Guizhou (CN)

(72) Inventors: Yan Liu, Shenzhen (CN); Kai Zhou, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 17/216,074

(22) Filed: Mar. 29, 2021

(65) Prior Publication Data
US 2021/0217305 A1 Jul. 15, 2021

Related U.S. Application Data

(63) Continuation of application No. PCT/CN2019/098057, filed on Jul. 27, 2019.

(30) Foreign Application Priority Data

Sep. 29, 2018 (CN) .......................... 201811153589.3

(51) Int. Cl.
*G08G 1/01* (2006.01)
*H04W 4/44* (2018.01)
(Continued)

(52) U.S. Cl.
CPC .......... *G08G 1/0108* (2013.01); *H04L 67/12* (2013.01); *H04W 4/12* (2013.01); *H04W 4/44* (2018.02)

(58) Field of Classification Search
CPC ........ G08G 1/0108; H04W 4/44; H04W 4/12; H04L 67/12
(Continued)

(56) References Cited

U.S. PATENT DOCUMENTS 7,010,583 B1* 3/2006 Aizono ................. G08G 1/205
709/219
7,245,216 B2 7/2007 Burkley et al.
(Continued)

FOREIGN PATENT DOCUMENTS

CN 102572992 A 7/2012
CN 103491617 A 1/2014
(Continued)

OTHER PUBLICATIONS

Hao, Y., et al., "Secure Cooperative Data Downloading IN Vehicular Ad Hoc Networks", IEEE Journal on Selected Areas in Communications/Supplement, vol. 31, No. 9, Sep. 2013, 15 Pages.
(Continued)

*Primary Examiner* — Zhen Y Wu
(74) *Attorney, Agent, or Firm* — Conley Rose, P.C.

(57) ABSTRACT

An IoV message exchange method performed by the server includes: obtaining position information of a first roadside unit, position information of a second roadside unit, and a roadside unit density reference value, the first roadside unit and the second roadside unit are on a first road section and are two adjacent roadside units, and the first road section is a road section between the first roadside unit and the second roadside unit; determining a density of roadside units on the first road section based on the position information and the roadside unit density reference value; determining a downlink message sending policy based on the density of the roadside units on the first road section; and sending the first IoV message to a first vehicle-mounted device according to the downlink message sending policy, the first vehicle-mounted device is a vehicle-mounted device on the first road section.

21 Claims, 23 Drawing Sheets

(51) Int. Cl.
*H04L 67/12* (2022.01)
*H04W 4/12* (2009.01)

(58) Field of Classification Search
USPC .......................................................... 340/934
See application file for complete search history.

(56) References Cited

U.S. PATENT DOCUMENTS

| | | | |
|---|---|---|---|
| 8,243,646 B2 | 8/2012 | Bauchot et al. | |
| 8,588,125 B2 | 11/2013 | Bauchot et al. | |
| 10,832,570 B1* | 11/2020 | Ibrahim | G08G 1/096838 |
| 11,240,647 B2* | 2/2022 | Watfa | H04W 4/50 |
| 2003/0060216 A1 | 3/2003 | Kamel et al. | |
| 2006/0158329 A1 | 7/2006 | Burkley et al. | |
| 2010/0281048 A1* | 11/2010 | Nagatomo | G08G 1/096775 |
| | | | 707/769 |
| 2011/0319127 A1 | 12/2011 | Yamamoto | |
| 2012/0257580 A1 | 10/2012 | Bauchot et al. | |
| 2013/0329651 A1* | 12/2013 | Lee | H04W 52/04 |
| | | | 370/329 |
| 2016/0150451 A1* | 5/2016 | Barreto De Miranda Sargento | |
| | | | H04W 36/30 |
| | | | 370/332 |
| 2017/0018187 A1* | 1/2017 | Kim | H04W 52/0229 |
| 2017/0142766 A1 | 5/2017 | Kim | |
| 2017/0330457 A1* | 11/2017 | Bhalla | G08G 1/093 |
| 2017/0331686 A1 | 11/2017 | Tsai et al. | |
| 2018/0115970 A1 | 4/2018 | Chae et al. | |
| 2018/0242190 A1 | 8/2018 | Khoryaev | H04L 47/32 |
| 2019/0028862 A1* | 1/2019 | Futaki | H04W 4/44 |
| 2019/0028974 A1* | 1/2019 | Wang | H04W 4/70 |
| 2019/0096238 A1* | 3/2019 | Ran | G08G 1/0145 |
| 2019/0107399 A1* | 4/2019 | Kawauchi | G01S 19/23 |
| 2019/0204108 A1* | 7/2019 | Benincasa | G08G 1/167 |
| 2019/0212746 A1* | 7/2019 | Cheng | G01K 3/14 |
| 2019/0244521 A1* | 8/2019 | Ran | G08G 1/22 |
| 2020/0020227 A1* | 1/2020 | Ran | G08G 1/075 |
| 2020/0020234 A1* | 1/2020 | Cheng | G08G 1/0112 |
| 2020/0064140 A1* | 2/2020 | Tarkiainen | G08G 1/096811 |
| 2020/0196120 A1 | 6/2020 | Uchiyama | |
| 2020/0228948 A1* | 7/2020 | Watfa | H04W 48/14 |
| 2020/0236520 A1* | 7/2020 | Kumabe | H04W 4/023 |
| 2020/0334978 A1* | 10/2020 | Pittman | H04L 47/821 |
| 2021/0005085 A1* | 1/2021 | Cheng | G08G 1/0141 |

FOREIGN PATENT DOCUMENTS

| | | |
|---|---|---|
| CN | 105282257 A | 1/2016 |
| CN | 105611503 A | 5/2016 |
| CN | 106470383 A | 3/2017 |
| CN | 106507449 A | 3/2017 |
| CN | 107040995 A | 8/2017 |
| CN | 107371137 A | 11/2017 |
| CN | 107439036 A | 12/2017 |
| CN | 108605210 A | 9/2018 |
| CN | 108616565 A | 10/2018 |
| DE | 102007045519 A1 | 4/2009 |
| EP | 3349514 A1 | 7/2018 |
| EP | 3352486 A1 | 7/2018 |
| EP | 2195946 B1 | 3/2020 |
| JP | 4018496 B2 | 12/2007 |

OTHER PUBLICATIONS

Zhou Huxing, "Research on Traffic Information Collection and Processing Methods in Internet of Vehicles", Jilin University, 2013, with an English abstract, 131 pages.

Javier Barrachina et al., "V2X-d: a Vehicular Density Estimation System that combines V2V and V2I Communications", 2013 IEEE, 7 pages.

* cited by examiner

INTERNET OF VEHICLES MESSAGE EXCHANGE METHOD AND RELATED APPARATUS

CROSS-REFERENCE TO RELATED APPLICATIONS

This is a continuation of Int'l Patent App. No. PCT/CN2019/098057, filed on Jul. 27, 2019, which claims priority to Chinese Patent App. No. 201811153589.3, filed on Sep. 29, 2018, both of which are incorporated by reference.

FIELD

This disclosure relates to the vehicles (IoV) communications field, and in particular, to an IoV message exchange method and a related apparatus.

BACKGROUND

Vehicle-to-everything (V2X) communication refers to a communications technology for connecting a vehicle to everything. V2X may be referred to as IoV, and the V2X communication is a technology developed based on the internet of things. The V2X communication is a basis and a key technology of a smart vehicle, autonomous driving, and an intelligent transportation system. The V2X communication includes four parts: (1) Vehicle-to-network (V2N) communication, which refers to communication between a vehicle-mounted device and a network device, and may be used to enable the vehicle-mounted device to be connected to a server through a wireless network, and to use application functions provided by the server, such as navigation, entertainment, and theft prevention. (2) Vehicle-to-vehicle (V2V) communication, which refers to communication between vehicle-mounted devices, and is mainly used for information exchange and reminding between vehicles. (3) Vehicle-to-infrastructure (V2I) communication, which refers to communication between a vehicle-mounted device and a roadside unit (RSU), and is mainly used to obtain road management information, for example, a traffic light signal. (4) Vehicle-to-pedestrian (V2P) communication, which refers to communication between a vehicle-mounted device and a pedestrian, and is mainly used to give a safety warning to a pedestrian or non-motor vehicle on a road.

In the foregoing four types of communication, user equipment (which refers to the vehicle-mounted device, the pedestrian, and the RSU) may communicate with the network device through a network communications interface (a Uu interface), and the user equipment may directly communicate with another user equipment through a communications interface (a PC5 interface). The vehicle-mounted device may exchange an IoV message with the network device through the Uu interface or the PC5 interface. A schematic diagram of a message exchange path may be shown in FIG. 1. In an uplink path, the vehicle-mounted device may send the IoV message to the network device through the Uu interface. Alternatively, the vehicle-mounted device may send the IoV message to a device around the vehicle-mounted device through the PC5 interface. After the RSU receives the IoV message, the RSU forwards the IoV message to the network device through the Uu interface. In a downlink path, the network device may send the IoV message to the vehicle-mounted device through the Uu interface. Alternatively, the network device may send the IoV message to the RSU through the Uu interface, and then the RSU forwards the IoV message to the vehicle-mounted device through the PC5 interface. Currently, the message exchange between the vehicle-mounted device and the network device is generally implemented based on one or two of the paths shown in FIG. 1. Due to a difference in deployment of roadside units on road sections, message repetition, message lost or a long transmission delay may occur in a message exchange process between the vehicle-mounted device and the network device.

SUMMARY

This disclosure provides an IoV message exchange method and a related apparatus, to resolve a problem of message repetition, a message loss, or a large transmission delay in a message exchange process between a vehicle-mounted device and a network device.

According to a first aspect, an IoV message exchange method is provided. The method may be applied to a V2X application server in a V2X system. The method includes: A server obtains position information of a first roadside unit, position information of a second roadside unit, and a roadside unit density reference value, where the first roadside unit and the second roadside unit are on a first road section and are two adjacent roadside units, and the first road section is a road section between the first roadside unit and the second roadside unit; the server determines a density of roadside units on the first road section based on the position information of the first roadside unit, the position information of the second roadside unit, and the roadside unit density reference value; the server determines a downlink message sending policy based on the density of the roadside units on the first road section; and the server sends a first IoV message to a first vehicle-mounted device according to the downlink message sending policy, where the first vehicle-mounted device is a vehicle-mounted device on the first road section.

In this technical solution, the server determines, based on the density between the two adjacent roadside units, the downlink message sending policy on the road section between the two roadside units, and sends an IoV message to the vehicle-mounted device on the road based on the downlink message sending policy. Deployment statuses of the roadside units at two ends of the road section are considered, to reduce cases such as repetition of a downlink IoV message and a message loss, and to fully utilize the roadside units.

The position information of the first roadside unit and the position information of the second roadside unit are information used to directly or indirectly indicate positions of the first roadside unit and the second roadside unit. In some possible implementations, the position information of the first roadside unit and the position information of the second roadside unit may have the following possible cases.

1. The position information of the first roadside unit and the position information of the second roadside unit may be absolute natural geographical position information of the first roadside unit and absolute natural geographical position information of the second roadside unit, namely, longitude information and latitude information of the first roadside unit, and longitude information and latitude information of the second roadside unit.

2. The position information of the first roadside unit and the position information of the second roadside unit may be name information of geographical positions of the first roadside unit and the second roadside unit, namely, information obtained by positioning the geographical positions of the first roadside unit and the second roadside unit on a map.

This is not limited to the foregoing case. In an optional implementation, there may be other information used to indicate positions of the first roadside unit and the second roadside unit. A distance between the first roadside unit and the second roadside unit may be determined through information for directly or indirectly indicating the positions of the first roadside unit and the second roadside unit.

The roadside unit density reference value is a reference value used to measure density of the first roadside unit and the second roadside unit. In some possible implementations, there may be the following several possible cases for the roadside unit density reference value.

1. The roadside unit density reference value is a reference value related to a safe driving distance, and the roadside unit density reference value may include a first safe driving distance and a second safe driving distance. The first safe driving distance is a safe driving distance of a vehicle-mounted device traveling on a road section in an urban area when a vehicle flow of the road section in the urban area is in an off-peak period. The second safe driving distance is a safe driving distance of the vehicle-mounted device traveling on a high-speed road section when a vehicle flow of the high-speed road section is in the off-peak period.

2. The roadside unit density reference value is a reference value related to a vehicle flow peak value, and the roadside unit density reference value may include a first vehicle flow peak distance and a second vehicle flow peak distance. The first vehicle flow peak distance is a product of a first coefficient and a first coverage distance, and the second vehicle flow peak distance is a product of a second coefficient and a first coverage distance. The first coefficient is a ratio of a vehicle flow high-peak value of the first road section to a vehicle flow off-peak value of the first road section. The second coefficient is a ratio of a vehicle flow low-peak value of the first road section to the vehicle flow off-peak value of the first road section. The first coverage distance is a sum of a coverage radius of the first roadside unit and a coverage radius of the second roadside unit.

This is not limited to the foregoing case. In an optional implementation, there may be another reference value used to measure or evaluate the density between the two adjacent roadside units.

With reference to the solution in the first aspect, in a possible implementation, the density of the roadside units may be divided into three levels: a first density, a second density, and a third density. The first density is higher than the second density, and the second density is higher than the third density.

With reference to the solution in the first aspect, in a possible implementation, the server may determine the density of the roadside units on the first road section in the following manner. If determining, based on the position information of the first roadside unit and the position information of the second roadside unit, that a first distance is greater than a first vehicle flow peak distance, the server determines that the density of the roadside units on the first road section is the third density. If determining, based on the position information of the first roadside unit and the position information of the second roadside unit, that a first distance is less than or equal to a first vehicle flow peak distance and is greater than or equal to a second vehicle flow peak distance, the server determines that the density of the roadside units on the first road section is the second density. If determining, based on the position information of the first roadside unit and the position information of the second roadside unit, that the first distance is less than or equal to a first vehicle flow peak distance, the server determines that the density of the roadside units on the first road section is the third density.

With reference to the solution in the first aspect, in a possible implementation, the server may determine the density of the roadside units on the first road section in the following manner. If determining, based on the position information of the first roadside unit and the position information of the second roadside unit, that a first distance is greater than a first safe driving distance, the server determines that the density of the roadside units on the first road section is the third density. If determining, based on the position information of the first roadside unit and the position information of the second roadside unit, that a first distance is less than or equal to a first safe driving distance and is greater than or equal to a second safe driving distance, the server determines that the density of the roadside units on the first road section is the second density. If determining, based on the position information of the first roadside unit and the position information of the second roadside unit, that a first distance is less than a second safe driving distance, the server determines that the density of the roadside units on the first road section is the first density.

According to the foregoing two possible implementations, the density of the roadside units on the first road section may be determined, in other words, the density of the adjacent roadside units is determined.

With reference to the solution in the first aspect, in some possible implementations, there may be the following several cases in which the server determines the downlink message sending policy based on the density.

1. If the density of the roadside units on the first road section is the first density, the server may determine that the downlink message sending policy is: sending the IoV message to the first roadside unit and the second roadside unit, and indicating the first roadside unit and the second roadside unit to forward the IoV message to the first vehicle-mounted device.

2. If the density of the roadside units on the first road section is the second density, the server may determine that the downlink message sending policy is one of the following policies.

(1) The server sends an IoV message to a device in a first multicast group, and indicates the first roadside unit and the second roadside unit to forward the IoV message to the first vehicle-mounted device. The first multicast group includes the first roadside unit, the second roadside unit, and the first vehicle-mounted device, in other words, the downlink IoV message is sent to the first vehicle-mounted device in a multicast manner.

(2) The server separately sends an IoV message to the first vehicle-mounted device, the first roadside unit, and the second roadside unit in a unicast manner, and indicates the first roadside unit and the second roadside unit to forward the IoV message to the first vehicle-mounted device.

3. If the density of the roadside units on the first road section is the third density, the server may determine that the downlink message sending policy is one of the following policies.

(1) The server sends an IoV message to the first vehicle-mounted device in the unicast manner.

(2) The server sends an IoV message to a device in a first multicast group, and indicates the first roadside unit and the second roadside unit to ignore forwarding of the IoV message. The first multicast group includes the first roadside unit, the second roadside unit, and the first vehicle-mounted device.

(3) The server sends an IoV message to a device in a second multicast group. The second multicast group includes the first vehicle-mounted device, and the first side unit and the second side unit are not in the second multicast group.

According to different message policies corresponding to the foregoing several types of different density, the IoV message may be sent based on a deployment status of the roadside units, to ensure that the vehicle-mounted device can receive the IoV message sent by the server.

According to a second aspect, another IoV message exchange method is provided. The method may be applied to a vehicle-mounted device in a V2X system. The method includes: The vehicle-mounted device receives a first IoV message; the vehicle-mounted device receives a second IoV message, where a message identifier of the second IoV message is the same as a message identifier of the first IoV message, a timestamp of the second IoV message is the same as a timestamp of the first IoV message; and the vehicle-mounted device discards the second IoV message.

In this technical solution, when receiving two IoV messages whose message identifiers and timestamps are the same, the vehicle-mounted device determines that a repeated IoV message is received, and then discards the repeatedly received IoV message, to implement de-duplication processing on the downlink IoV message, and to reduce repetition of the downlink IoV message.

According to a third aspect, still another IoV message exchange method is provided. The method may be applied to a vehicle-mounted device in a V2X system. The method includes: The vehicle-mounted device receives a first IoV message, where a transmit end of the first IoV message is a roadside unit or a server; the vehicle-mounted device determines an uplink message sending policy based on the first IoV message; and sends the vehicle-mounted device, a second IoV message to the server according to the uplink message sending policy.

In this technical solution, the uplink message sending policy is set and selected based on the IoV message received by the vehicle-mounted device, to reduce cases such as repetition of an uplink IoV message and a message loss, and to fully utilize the roadside unit.

With reference to the technical solution in the third aspect, in some possible embodiments, a manner in which the vehicle-mounted device determines the uplink message sending policy based on the first IoV message may include the following several cases.

1. The vehicle-mounted device may determine the uplink message sending policy based on the transmit end of the first IoV message. If the transmit end of the first IoV message is the roadside unit, the vehicle-mounted device determines that the uplink message sending policy is: sending an IoV message to the roadside unit, and indicating the roadside unit to forward the IoV message to the server. If the transmit end of the first IoV message is not the roadside unit, the vehicle-mounted device determines that the uplink message sending policy is: sending an IoV message to the server in a unicast manner.

2. The first IoV message carries deployment status information of a first roadside unit, and the first roadside unit is a roadside unit on a traveling path of the vehicle-mounted device or a roadside unit in a coverage range of the server. The vehicle-mounted device may determine the uplink message sending policy based on content of the first IoV message. Specifically, if determining, based on the deployment status information of the first roadside unit, that the vehicle-mounted device is in a coverage range of the first roadside unit, the vehicle-mounted device determines that the uplink message sending policy is: sending an IoV message to the first roadside unit, and indicating the first roadside unit to forward the IoV message to the server. If determining, based on the deployment status information of the first roadside unit, that the vehicle-mounted device is not in the coverage range of the first roadside unit, the vehicle-mounted device determines that the uplink message sending policy is: sending the IoV message to the server in the unicast manner.

Optionally, when the first IoV message is not received, the vehicle-mounted device determines that the uplink message sending policy is: separately sending an IoV message to the server and the roadside unit, and indicating the roadside unit to ignore forwarding of the IoV message or indicating the roadside unit to forward the IoV message to the server.

The policy for sending the uplink IoV message by the vehicle-mounted device is determined based on a case of receiving the IoV message by the vehicle-mounted device, to ensure that the uplink IoV message can be received by the server, and to avoid a message loss.

According to a fourth aspect, still another IoV message exchange method is provided. The method may be applied to a V2X application server in a V2X system. The method includes: A server receives a first IoV message; and the server receives a second IoV message, where a vehicle identification number of the second IoV message is the same as a vehicle identification number of the first IoV message, and a timestamp of the second IoV message is the same as a timestamp of the first IoV message, and the server discards the second IoV message.

In this technical solution, when receiving two IoV messages whose vehicle identification numbers and timestamps are the same, the server determines that a repeated IoV message is received, and then discards the repeated IoV message, to implement de-duplication processing on the uplink IoV message. This can reduce a case in which the repeated uplink IoV message is received.

According to a fifth aspect, still another IoV message exchange method is provided. The method may be applied to a roadside unit in a V2X system. The method includes: A roadside unit receives a first IoV message and a first forwarding indication, or a first IoV message and a second forwarding indication, where the second forwarding indication is used to indicate that the roadside unit ignores forwarding of the first IoV message, and the first forwarding indication is used to indicate that the roadside unit forwards the first IoV message; and the roadside unit ignores, based on the second forwarding indication, forwarding of the first IoV message, or after adding an original timestamp of the first IoV message to the first IoV message, the roadside unit forwards, based on the first forwarding indication, the first IoV message carrying the original timestamp.

In this technical solution, the roadside unit determines, based on a forwarding indication received together with the IoV message, whether to forward the IoV message. Because the IoV message passes through the roadside unit, the roadside unit is fully utilized.

According to a sixth aspect, a server is configured to perform the IoV message exchange method described in the first aspect or the fourth aspect. The server may include a memory and a processor coupled to the memory. The memory is configured to store program code of the IoV message exchange method described in the first aspect or the fourth aspect. The processor is configured to execute the program code stored in the memory, in other words, perform the method provided in the first aspect, the method provided in any one of the possible implementations of the first aspect, the method provided in the fourth aspect, or the method provided in any one of the possible implementations of the fourth aspect.

According to a seventh aspect, a vehicle-mounted device is configured to perform the IoV message exchange method described in the second aspect or the third aspect. The vehicle-mounted device may include a memory and a processor coupled to the memory. The memory is configured to store program code of the IoV message exchange method described in the second aspect or the third aspect. The processor is configured to execute the program code stored in the memory, in other words, perform the method provided in the second aspect, the method provided in any one of the possible implementations of the second aspect, the method provided in the third aspect, or the method provided in any one of the possible implementations of the third aspect.

According to an eighth aspect, a roadside unit is configured to perform the IoV message exchange method described in the fifth aspect. This vehicle-mounted device may include a memory and a processor coupled to the memory. The memory is configured to store program code of the IoV message exchange method described in the fifth aspect. The processor is configured to execute the program code stored in the memory, in other words, perform the method provided in the fifth aspect, or the method provided in any one of the possible implementations of the fifth aspect.

According to a ninth aspect, another server is provided. The server may include a plurality of function modules configured to correspondingly perform the method provided in the first aspect, the method provided in any one of the possible implementations of the first aspect, the method provided in the fourth aspect, or the method provided in any one of the possible implementations of the fourth aspect.

According to a tenth aspect, another vehicle-mounted device is provided. The vehicle-mounted device may include a plurality of function modules configured to correspondingly perform the method provided in the second aspect, the method provided in any one of the possible implementations of the second aspect, the method provided in the third aspect, or the method provided in any one of the possible implementations of the third aspect.

According to an eleventh aspect, another roadside unit is provided. The roadside unit may include a plurality of function modules configured to correspondingly perform the method provided in the fifth aspect or the method provided in any one of the possible implementations of the fifth aspect.

According to a twelfth aspect, a V2X system is provided. The V2X system includes a server, a vehicle-mounted device, and a roadside unit. The server may be the server described in the sixth aspect, the vehicle-mounted device may be the vehicle-mounted device described in the seventh aspect, and the roadside unit may be the roadside unit described in the eighth aspect. Alternatively, the server may be the server described in the ninth aspect, the vehicle-mounted device may be the vehicle-mounted device described in the tenth aspect, and the roadside unit may be the roadside unit described in the eleventh aspect.

According to a thirteenth aspect, a computer-readable storage medium is provided. The computer-readable storage medium stores an instruction, and when the instruction is run on a computer, the computer is enabled to perform the IoV message exchange method described in the first aspect or the fourth aspect.

According to a fourteenth aspect, a computer-readable storage medium is provided. The computer-readable storage medium stores an instruction, and when the instruction is run on a computer, the computer is enabled to perform the IoV message exchange method described in the second aspect or the third aspect.

According to a fifteenth aspect, a computer-readable storage medium is provided. The computer-readable storage medium stores an instruction, and when the instruction is run on a computer, the computer is enabled to perform the IoV message exchange method described in the fifth aspect.

According to a sixteenth aspect, a computer program product including an instruction is provided. When the computer program product runs on a computer, the computer is enabled to perform the IoV message exchange method described in the first aspect or the fourth aspect.

According to a seventeenth aspect, a computer program product including an instruction is provided. When the computer program product runs on a computer, the computer is enabled to perform the IoV message exchange method described in the second aspect or the third aspect.

According to an eighteenth aspect, a computer program product including an instruction is provided. When the computer program product runs on a computer, the computer is enabled to perform the IoV message exchange method described in the fifth aspect.

By implementing the technical solutions of this disclosure, the roadside unit can be fully utilized, and a case such as message repetition or a message loss can be avoided.

DETAILED DESCRIPTION

The following describes the technical solutions in the embodiments with reference to the accompanying drawings.

Figure 2:
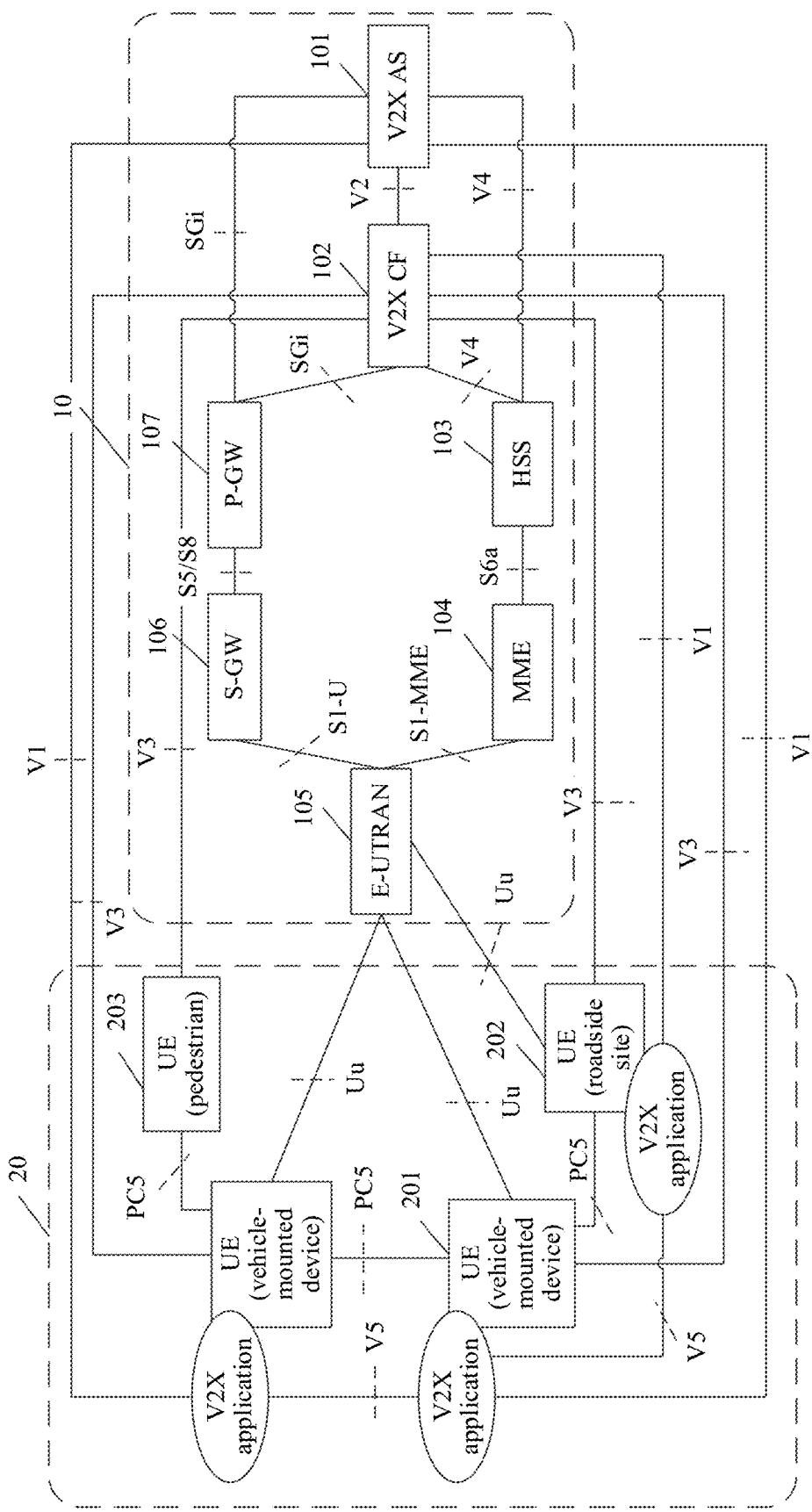
FIG. 2 is a schematic diagram of a system architecture of a V2X system.

The disclosed solutions are applicable to a V2X system. To facilitate understanding of the solutions, a system architecture of the V2X system is first described. FIG. 2 is a schematic diagram of a system architecture of a V2X system. As shown in the figure, the V2X system includes a network device 10 and user equipment (UE) 20. The network device 10 includes network elements such as IoVa V2X application server (AS) 101, IoVa V2X control function (CF) unit 102, a home subscriber server (HSS) 103, a mobility management entity (MME) 104, an evolved Universal Mobile Telecommunications System (UMTS) terrestrial radio access network (eE-UTRAN) 105, a serving gateway (S-GW) 106, and a public data network gateway (P-GW) 107. In the network device, the network elements such as the HSS, the MME, the E-UTRAN, the S-GW, and the P-GW are network elements in a conventional mobile communications system. The E-UTRAN is a radio access part of the mobile communications system, and the E-UTRAN includes at least one evolved NodeB, and is configured to receive a message sent by the user equipment and send the message to a corresponding network element. The E-UTRAN may communicate with the user equipment through a Uu interface. Compared with that in the conventional mobile communications system, the V2X AS and the V2X CF are network elements added to an IoV system. The V2X AS is configured to provide a V2X service for the user equipment, and may be configured to: provide service support for the V2X application running on the user equipment, and perform related V2X service logic processing based on a message reported by the V2X application. The V2X CF is used for V2X service authentication and authorization. The user equipment 20 includes a vehicle-mounted device (vehicle) 201, a roadside site (stationary) 202, and a pedestrian 203. The user equipment and the user equipment may directly communicate with each other by using a PC5 interface.

In some possible implementations, the vehicle-mounted device may also be referred to as an on-board unit (OBU), a vehicular telematics box (T-BOX), or the like. In some possible implementations, the roadside site may also be referred to as an RSU, a roadside device, or the like. For ease of description, in subsequent descriptions, the vehicle-mounted device is used to represent the vehicle-mounted device in FIG. 1, and the RSU is used to represent the roadside site in FIG. 1.

It can be learned from the system architecture shown in FIG. 2 that there may be three manners in which the vehicle-mounted device sends an uplink IoV message to a V2X application server and the V2X application server sends a downlink IoV message to the vehicle-mounted device.

There are three manners in which the V2X application server sends the downlink IoV message to the vehicle-mounted device.

1. The V2X application server sends the downlink IoV message to the vehicle-mounted device by using a first downlink path shown in FIG. 1, in other words, the V2X application server sends the downlink IoV message to the vehicle-mounted device through the Uu interface.

Figure 3A:
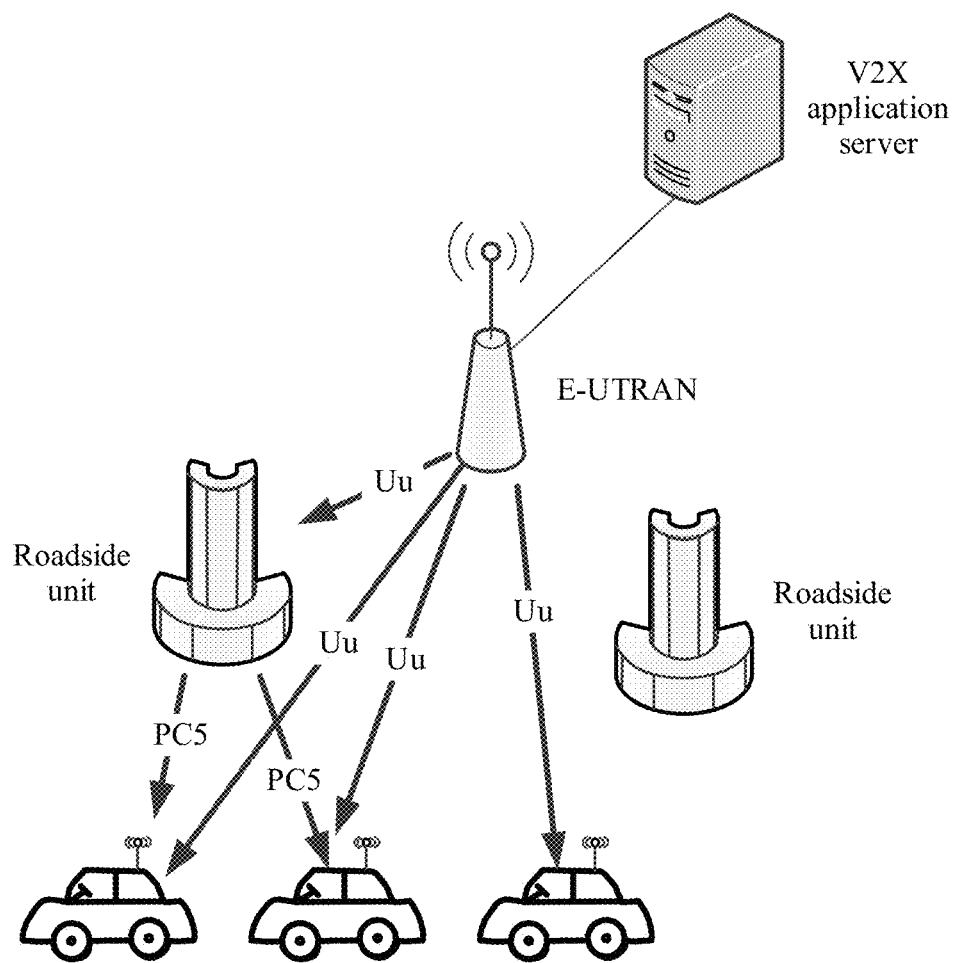
FIG. 3A to FIG. 3F are schematic diagrams of scenarios in which a vehicle-mounted device sends an uplink IoV message to a V2X application server and the V2X application server sends a downlink IoV message to the vehicle-mounted device.

A schematic diagram of a scenario of this manner may be shown in FIG. 3A. It can be learned from FIG. 3A that, the V2X application server sends the downlink IoV message through the Uu interface. In addition to that the vehicle-mounted device may receive the downlink IoV message, the roadside unit may also receive the downlink IoV message. After receiving the downlink IoV message, the roadside unit forwards the downlink IoV message to the vehicle-mounted device. When the vehicle-mounted device is in a coverage range of the roadside unit, the vehicle-mounted device may receive the downlink IoV message sent by the V2X application server, and may further receive the downlink IoV message forwarded by the roadside unit. Therefore, there is a problem that the vehicle-mounted device receives a repeated downlink IoV message.

2. The V2X application server sends the downlink IoV message to the vehicle-mounted device by using a second downlink path shown in FIG. 1, in other words, the V2X application server sends the downlink IoV message to the roadside unit through the Uu interface. Then, the roadside unit forwards the downlink IoV message to the vehicle-mounted device through the PC5 interface.

Figure 3B:
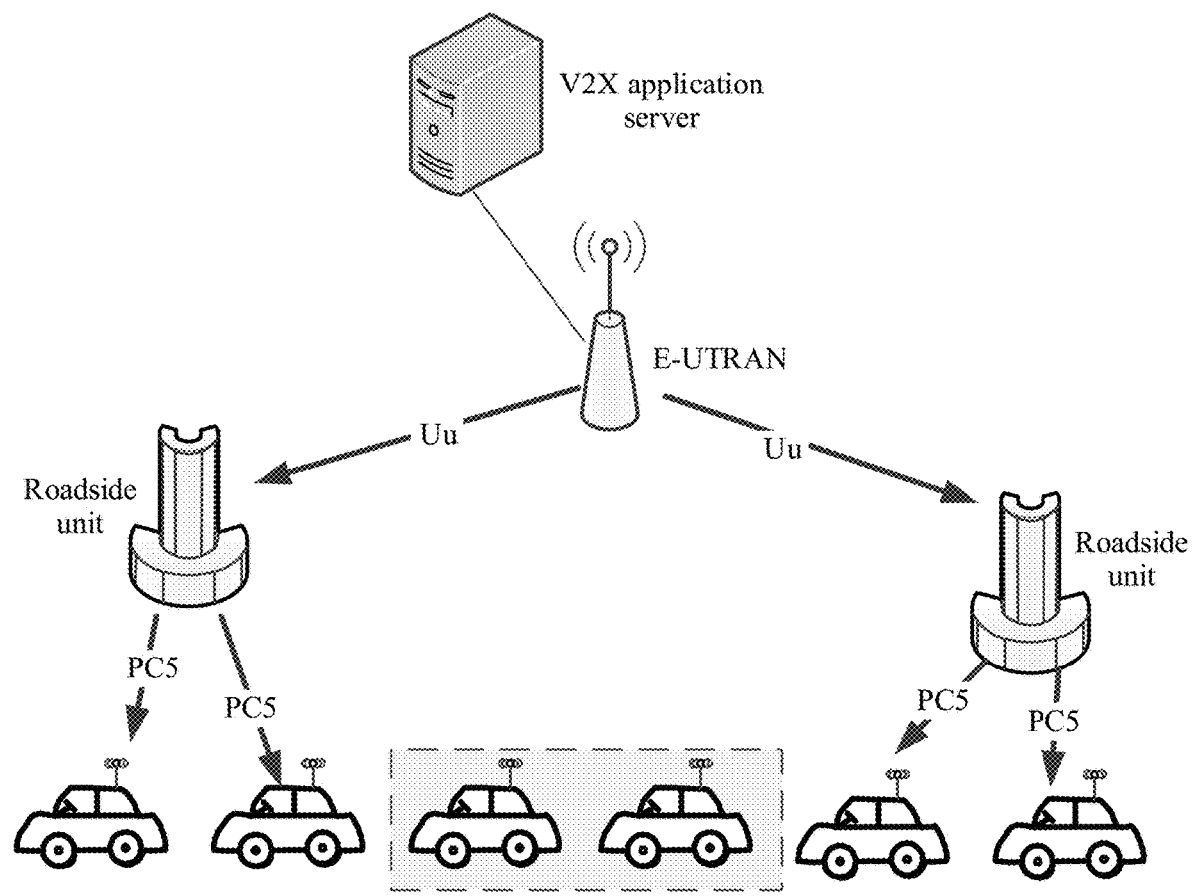

A schematic diagram of a scenario of this manner may be shown in FIG. 3B. It can be learned from FIG. 3B that, when the vehicle-mounted device is located on a road section on which relatively sparse roadside units are deployed, the vehicle-mounted device cannot receive the downlink IoV message forwarded by the roadside units. In this case, the vehicle-mounted device cannot receive the downlink IoV message sent by the V2X application server. Therefore, there is a problem that the downlink IoV message is lost.

Figure 1:
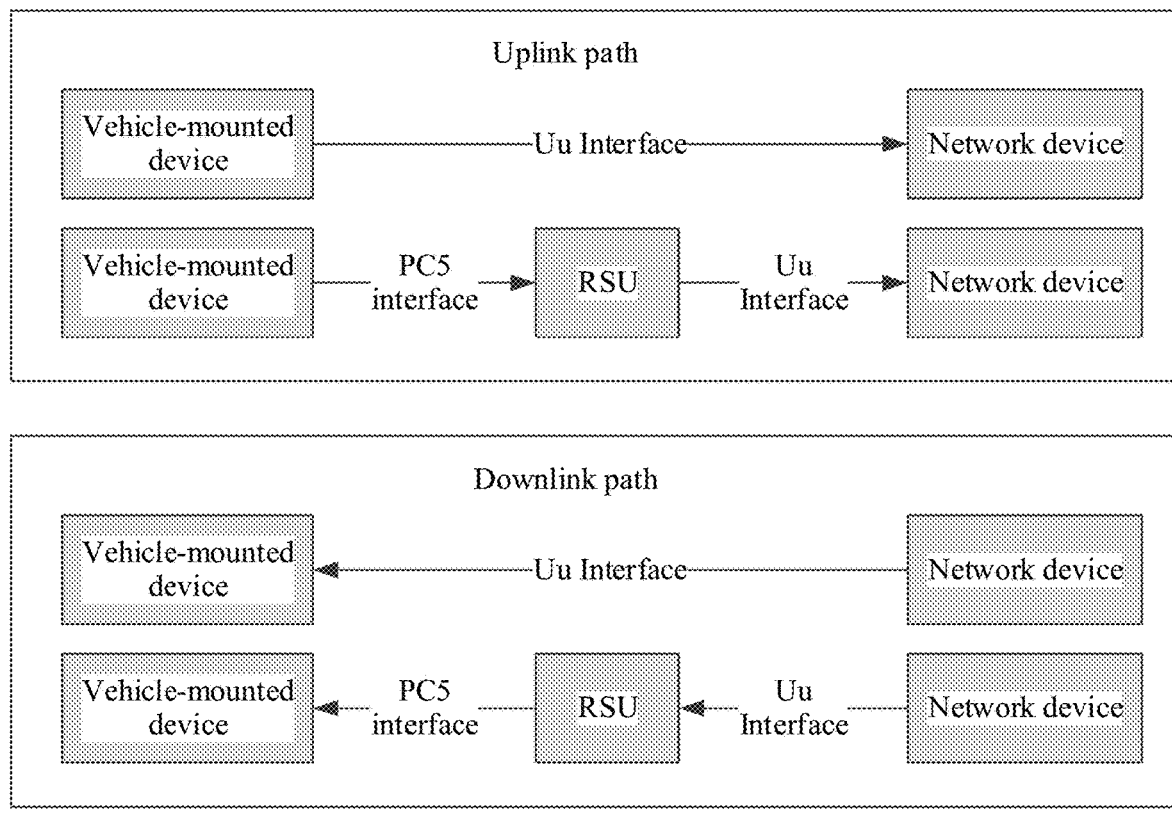
FIG. 1 is a schematic diagram of a V2X message exchange path.

3. The V2X application server delivers the IoV message to the vehicle-mounted device by using the first downlink path and the second downlink path that are shown in FIG. 1, in other words, the V2X application server sends the downlink IoV message to the roadside unit through the Uu interface, and then the roadside unit forwards the downlink IoV message to the vehicle-mounted device through the PC5 interface. In addition, the V2X server sends the downlink IoV message to the vehicle-mounted device through the Uu interface.

Figure 3C:
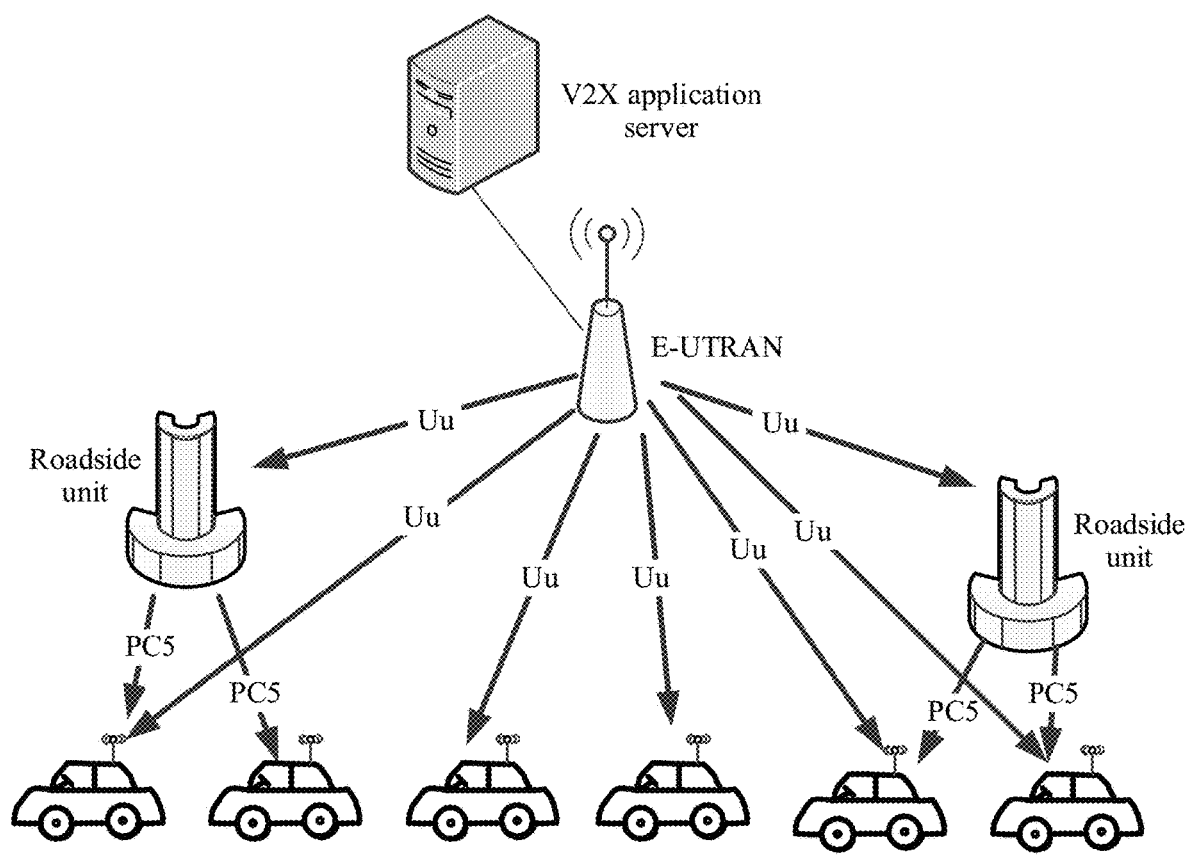

A schematic diagram of a scenario of this manner may be shown in FIG. 3C. It can be learned from FIG. 3 C that, when the vehicle-mounted device is in the coverage range of the roadside unit, the vehicle-mounted device may receive the downlink IoV message sent by the V2X application server, and may further receive the IoV message forwarded by the roadside unit. Therefore, there is a problem that the vehicle-mounted device receives a repeated downlink IoV message.

Three manners in which the vehicle-mounted device sends the uplink IoV message to the V2X server are as follows.

1. The vehicle-mounted device sends the uplink IoV message to the V2X application server by using the first uplink path shown in FIG. 1, in other words, the vehicle-mounted device sends the uplink IoV message to the V2X application server through the Uu interface.

Figure 3D:
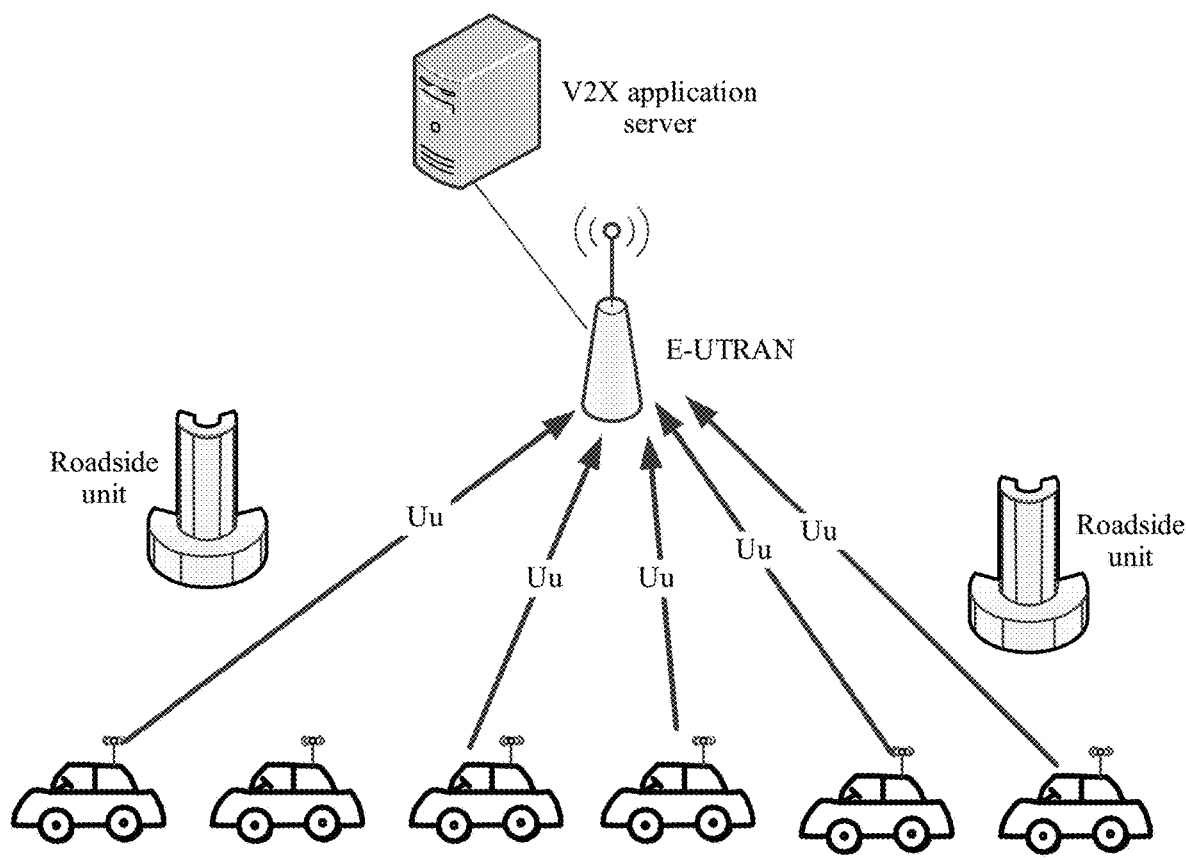

A schematic diagram of a scenario of this manner may be shown in FIG. 3D. It can be learned from FIG. 3D that, all vehicle-mounted devices send the uplink IoV message to the V2X application server. This increases load of the V2X application server. The V2X application server needs to interact with each vehicle-mounted device. This results in a relatively large delay, and does not fully utilize the roadside units.

2. The vehicle-mounted device sends the uplink IoV message to the V2X application server by using the second uplink path shown in FIG. 1, in other words, the vehicle-mounted device sends the IoV message to surrounding user equipment through the PC5 interface. After the roadside unit receives the IoV message, forward the IoV message as the uplink IoV message to the V2X application server through the Uu interface.

Figure 3E:
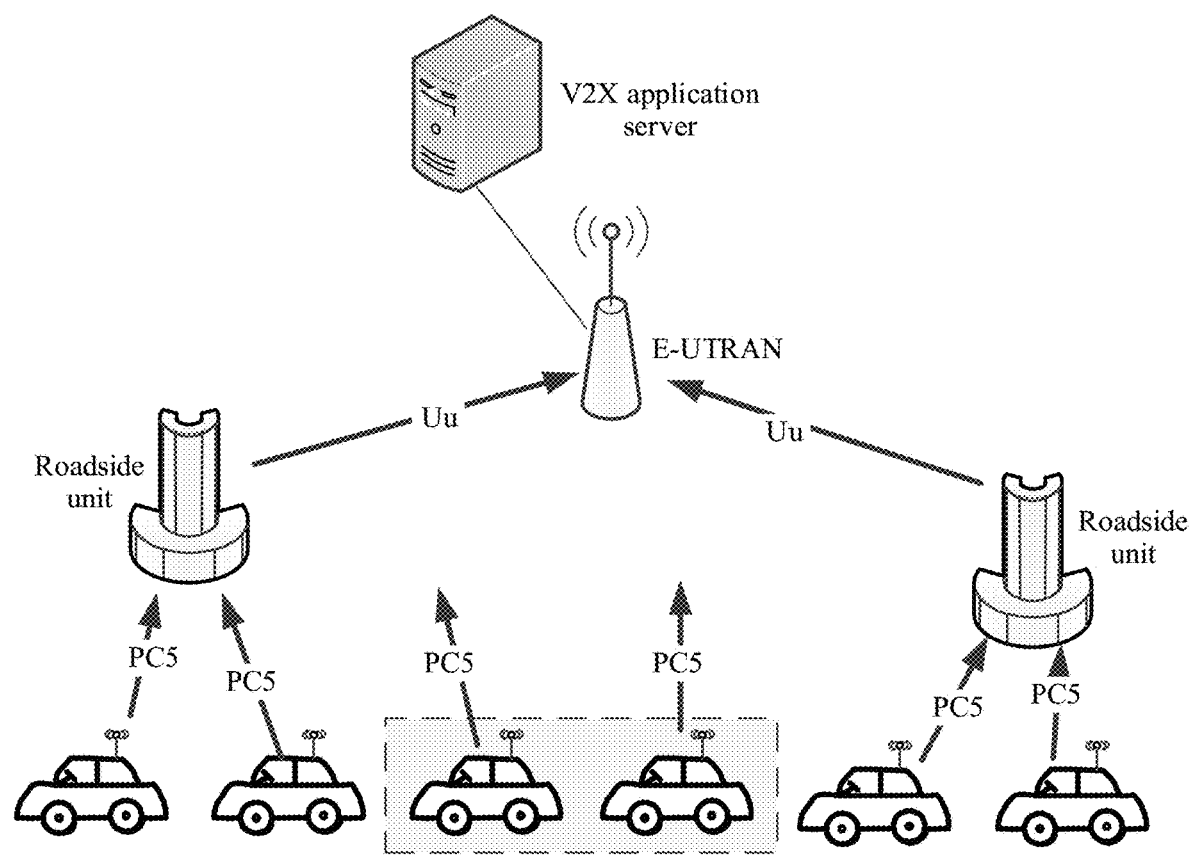

A schematic diagram of a scenario of this manner may be shown in FIG. 3E. It can be learned from FIG. 3E that all vehicle-mounted devices send the uplink IoV message through the PC5 interface. When the vehicle-mounted devices are located on the road section on which relatively sparse roadside units are deployed, the roadside unit cannot receive the uplink IoV messages sent by the vehicle-mounted devices, and thus the V2X application server cannot receive the uplink IoV messages sent by the vehicle-mounted devices. Therefore, there is a problem that the uplink IoV message is lost.

3. The vehicle-mounted device sends the uplink IoV message to the V2X application server by using the first path and the second path shown in FIG. 1, in other words, the vehicle-mounted device sends the uplink IoV message to the roadside unit through the PC5 interface, and then the roadside unit forwards the uplink IoV message to the V2X server through the Uu interface. In addition, the vehicle-mounted device sends the uplink IoV message to the V2X application server through the Uu interface.

Figure 3F:
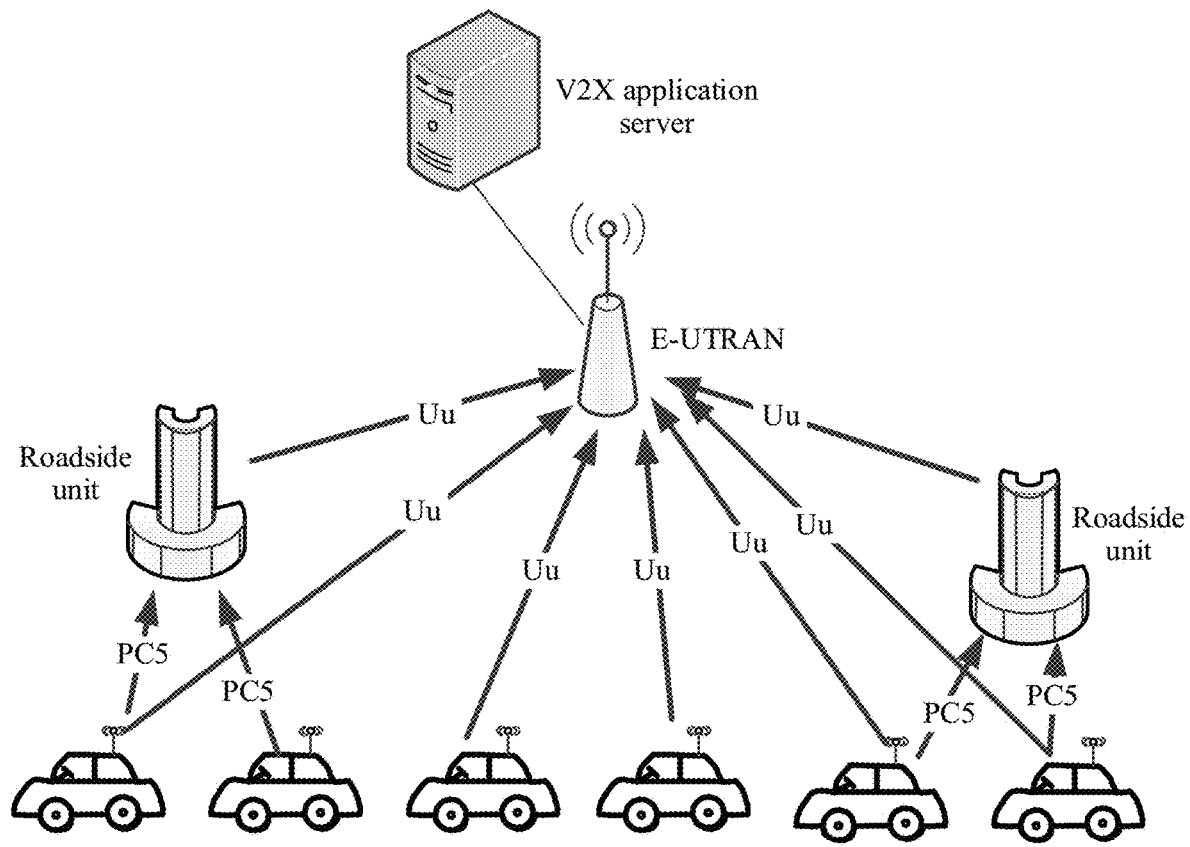

A schematic diagram of a scenario of this manner may be shown in FIG. 3F. It can be learned from FIG. 3F that, all vehicle-mounted devices send the uplink IoV message by using two paths. When the vehicle-mounted devices are located on a road section on which relatively dense roadside units are deployed, for the uplink IoV message sent by the vehicle-mounted devices, the V2X application server can receive the uplink IoV message sent by the vehicle-mounted device, and further receive the uplink IoV message forwarded by the roadside unit. Therefore, there is a problem that the V2X server receives a repeated uplink IoV message.

It can be learned from FIG. 3A to FIG. 3F that, in a single manner of sending the downlink IoV message and the uplink IoV message, there are problems such as message repetition, a message loss, a large delay, or a failure to fully utilize the roadside unit in the message exchange between the vehicle-mounted device and the V2X application server.

Therefore, this disclosure provides an IoV message exchange method and a device for implementing the method, to resolve the problems in the foregoing several manners in which the vehicle-mounted device sends the uplink IoV message to the V2X application server and the V2X application server sends the downlink IoV message to the vehicle-mounted device.

With reference to a feature of a road section, a road section on which roadside units are deployed is divided into three road sections with different density based on a density of the roadside units, and different message sending policies are set for the road sections with the different density. The V2X application server and the vehicle-mounted device may send the uplink IoV message and the downlink IoV message according to a message sending policy corresponding to the road section, to reduce cases such as the message repetition, the message loss, the large transmission delay, and the failure to fully utilize the roadside unit, and to maximally improve message exchange and transmission efficiency between the vehicle-mounted device and the V2X application server. The following describes the solutions.

Figure 4:
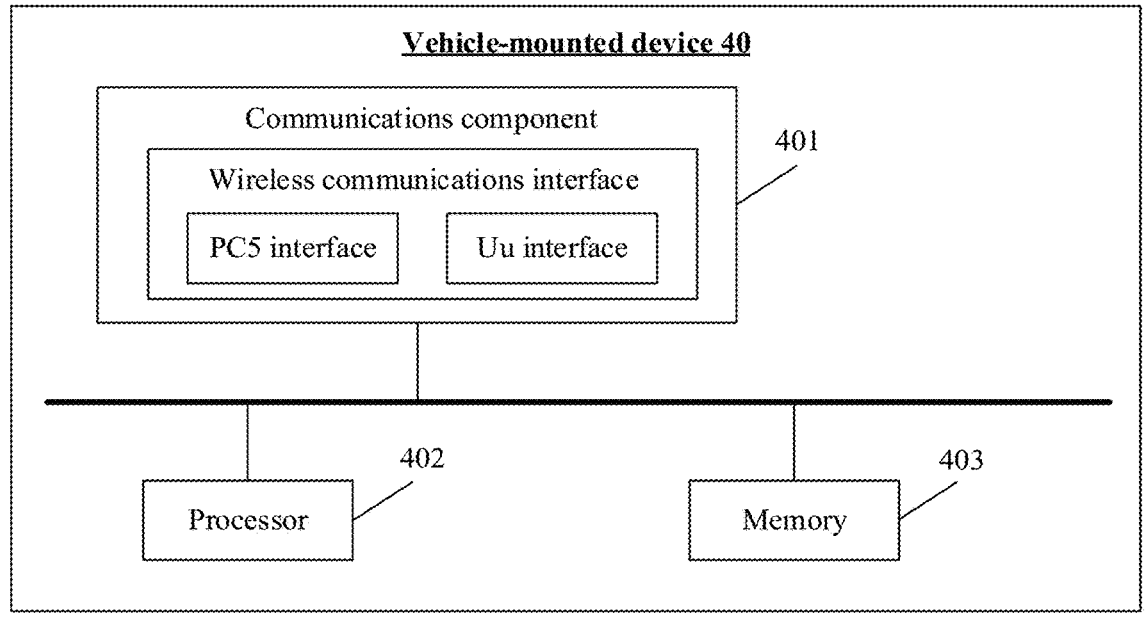
FIG. 4 is a schematic structural diagram of a vehicle-mounted device.

FIG. 4 is a schematic structural diagram of a vehicle-mounted device 40. The vehicle-mounted device 40 may be the vehicle-mounted device 201 in the V2X system shown in FIG. 2. As shown in FIG. 4, the vehicle-mounted device 40 may include a communications component 401, one or more processors 402, and a memory 403. The communications component 401, the processor 402, and the memory 403 may be connected by using one or more buses, or may be connected in another manner.

The communications component 401 may be used by the vehicle-mounted device 40 to communicate with another communications device. The communications component 401 may include a wireless communications interface. The wireless communications interface may be, for example, a PC5 interface or a Uu interface. The PC5 interface may be used by the vehicle-mounted device 40 to communicate with user equipment in the V2X system, such as another vehicle-mounted device, a roadside unit, or a pedestrian. The Uu interface may be used by the vehicle-mounted device 40 to communicate with a network device in the V2X system, such as a V2X application server or a V2X control unit. In specific implementation, the communications component 401 may include a radio frequency interface and a radio frequency circuit, to implement a function implemented by the wireless communications interface. The radio frequency circuit may include a transceiver, a component (such as a conductor or a conducting wire) configured to send and receive an electromagnetic wave in free space during wireless communication, and the like. Optionally, the communications component 401 may further include a wired communications interface, and the wired communications interface may be, for example, an Ethernet interface.

The memory 403 is coupled to the processor 402, and is configured to store various software programs and/or a plurality of sets of instructions. In specific implementation, the memory 403 may include a high-speed random-access memory (RAM), and may also include a non-volatile memory. The memory 403 may store a network communication program, and the network communication program may be used to communicate with another communications device in the V2X system. The memory 403 may further have a built-in operating system, for example, an operating system such as Android or Linux.

In some embodiments, the memory 403 may be configured to store an implementation program, on a vehicle-mounted device side, of the IoV message exchange method provided in one or more embodiments. For implementation of the IoV message exchange method, refer to subsequent embodiments. In an optional embodiment, the memory 403 may further store deployment status information that is of the roadside unit and that is delivered by the V2X server in the V2X system. For the deployment status information of the roadside unit, refer to subsequent embodiments.

The processor 402 may be a general-purpose processor, for example, a central processing unit (CPU). The processor 402 may also be a hardware chip. The hardware chip may be one or a combination of the following: an application-specific integrated circuit (ASIC), a field-programmable gate array (FPGA), or a complex programmable logic device (CPLD). Alternatively, the processor 402 may be a combination of the foregoing processors. The processor 402 may process data received by the communications component 401, and the processor 402 may further process data that is to be sent to the communications component 401 for transmission over a wireless transmission medium.

The processor 402 may be configured to read and execute a computer-readable instruction. Specifically, the processor 402 may be configured to invoke a program stored in the memory 403, for example, an implementation program, on a vehicle-mounted device side, of an IoV message exchange method and execute an instruction included in the program.

The processor 402 is configured to: determine, based on an IoV message received by the communications component 401, an uplink message sending policy used by the vehicle-mounted device to send an uplink IoV message to the V2X server, and send the uplink IoV message according to the uplink message sending policy by using the communications component 401. For a manner of determining, by the processor 401, which policy is the uplink message sending policy, refer to a subsequent embodiment.

It should be understood that the vehicle-mounted device 40 shown in FIG. 4 is merely an implementation. In actual application, the vehicle-mounted device 40 may include more or fewer components. This is not limited in this disclosure.

Figure 5:
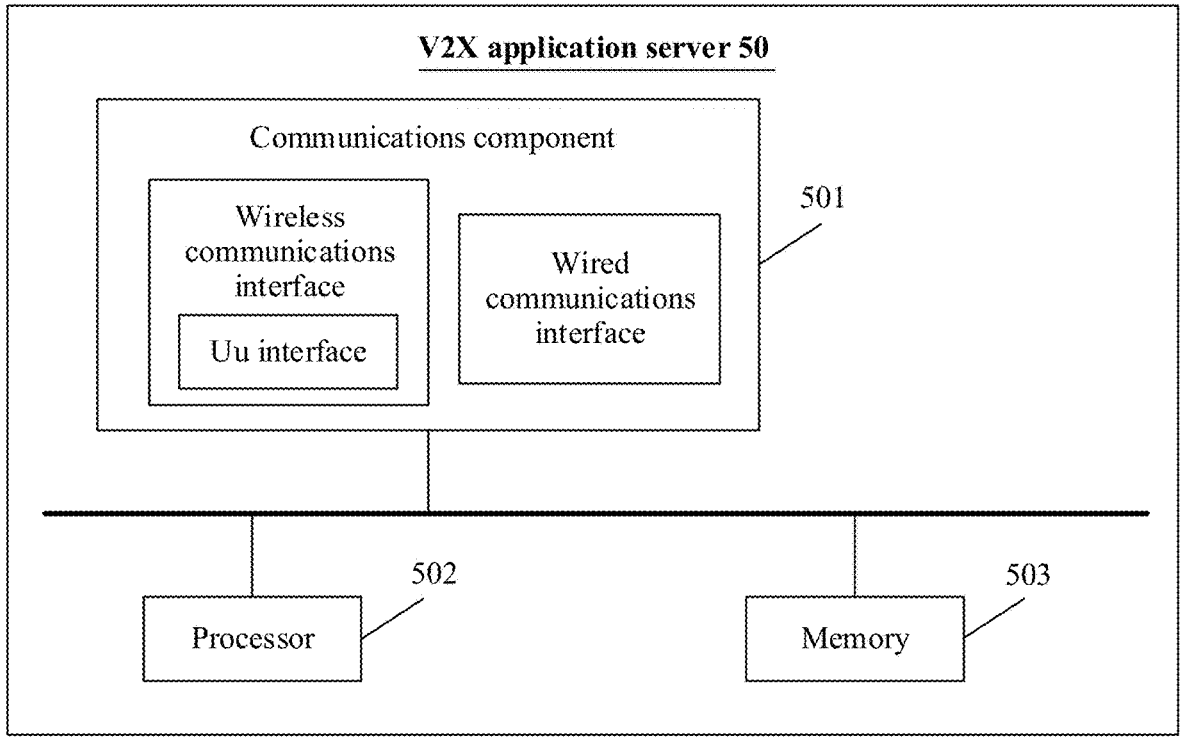
FIG. 5 is a schematic structural diagram of a V2X server.

FIG. 5 is a schematic structural diagram of a V2X application server 50. The V2X application server may be the V2X application server 101 in the V2X system shown in FIG. 1. As shown in FIG. 5, the V2X application server 50 may include one or more processors 502 and a memory 503. Optionally, the V2X application server may further include a communications component 501. The communications component 501, the processor 502, and the memory 503 may be connected by using one or more buses, or may be connected in another manner.

The communications component 501 may be used by the V2X application server 50 to communicate with another communications device, for example, a roadside unit or a vehicle-mounted device. The communications component 501 may include a wireless communications interface, and the wireless communications interface may be, for example, a Uu interface. In specific implementation, the communications component may include a radio frequency interface and a radio frequency circuit, to implement a function implemented by the wireless communications interface. The radio frequency circuit may include a transceiver, a component (such as a conductor or a conducting wire) configured to send and receive an electromagnetic wave in free space during wireless communication, and the like. Optionally, the communications component 501 may further include a wired communications interface. The wired communications interface may be, for example, an Ethernet interface or an optical fiber interface.

The memory 503 is coupled with the processor 502, and is configured to store various software programs and/or a plurality of sets of instructions. In specific implementation, the memory 503 may include a high-speed RAM, and may also include a non-volatile memory. The memory 503 may store a network communication program, and the network communication program may be used to communicate with another communications device in the V2X system. The memory 503 may further have a built-in operating system, for example, an operating system such as Windows or Linux.

The memory 503 may be configured to store an implementation program, on a server side, of the IoV message exchange method. For implementation of the IoV message exchange method, refer to subsequent embodiments. In an optional embodiment, the memory 503 may further store position information of a roadside unit in the V2X system, a roadside unit density reference value, and the like. For the position information of the roadside unit and the roadside unit density reference value in, refer to subsequent embodiments.

The processor 502 may be a general-purpose processor, for example, a CPU. The processor 502 may also be a hardware chip. The hardware chip may be one or a combination of the following: an ASIC, an FPGA, or a CPLD. Alternatively, the processor 502 may be a combination of the foregoing processors. The processor 502 may process data received by the communications component 501, and the processor 502 may further process data that is to be sent to the communications component 501 for transmission over a wireless transmission medium.

The processor 502 may be configured to read and execute a computer-readable instruction. Specifically, the processor 502 may be configured to: invoke a program stored in the memory 503, for example, an implementation program, on a server side, of an IoV message exchange method and execute an instruction included in the program.

The processor 502 is configured to: determine a density of roadside units based on the position information of the roadside units and the roadside unit density reference value, determine, based on the density of the roadside units, a downlink message sending policy for sending a downlink IoV message to the vehicle-mounted device, and sends the downlink IoV message to the vehicle-mounted device according to the downlink message sending policy by using the communications component 501. For a manner in which the processor 502 determines the density of the roadside units and a manner in which the processor 502 determines, based on the density, which policy is the uplink message sending policy, refer to subsequent embodiments.

It should be understood that the V2X application server 50 shown in FIG. 5 is merely an implementation. In actual application, the V2X application server 50 may include more or fewer components. This is not limited in this disclosure.

Figure 6:
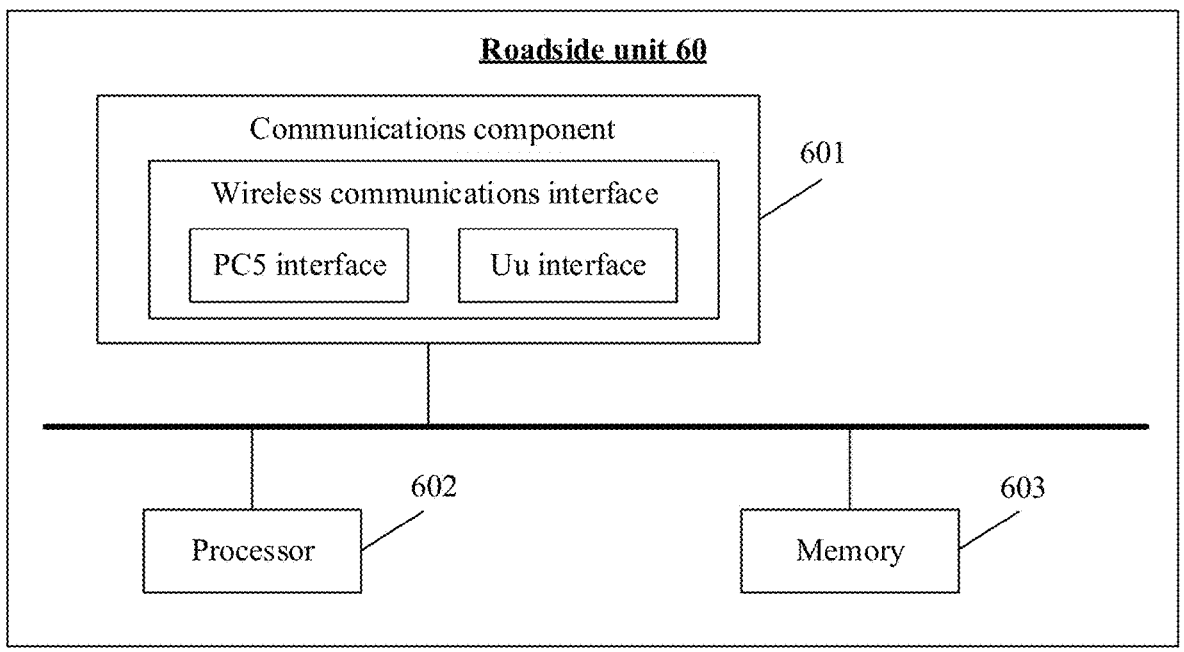
FIG. 6 is a schematic structural diagram of an RSU.

FIG. 6 is a schematic structural diagram of a roadside unit 60. The roadside unit 60 may be the roadside site 202 in the V2X system shown in FIG. 2. As shown in FIG. 6, the roadside unit 60 may include a communications component 601, one or more processors 602, and a memory 603. The communications component 601, the processor 602, and the memory 603 may be connected by using one or more buses, or may be connected in another manner.

The communications component 601 may be configured for the roadside unit 60 to communicate with another communications device. The communications component 601 may include a wireless communications interface. The wireless communications interface may be, for example, a PC5 interface or a Uu interface. The PC5 interface may be used by the roadside unit 60 to communicate with user equipment such as a vehicle-mounted device and a pedestrian in the V2X system. The Uu interface may be used by the roadside unit 60 to communicate with a network device such as a V2X server or a V2X control unit in the V2X system. In specific implementation, the communications component 601 may include a radio frequency interface and a radio frequency circuit, to implement a function implemented by the wireless communications interface. The radio frequency circuit may include a transceiver, a component (such as a conductor or a conducting wire) configured to send and receive an electromagnetic wave in free space during wireless communication, and the like.

The memory 603 is coupled to the processor 602, and is configured to store various software programs and/or a plurality of sets of instructions. In specific implementation, the memory 603 may include a high-speed RAM, and may also include a non-volatile memory. The memory 603 may store a network communication program, and the network communication program may be used to communicate with another communications device in the V2X system.

The memory 603 may be configured to store an implementation program, on a roadside unit side, of the IoV message exchange method. The implementation program may include one or more implementation programs of an implementation program on a first roadside unit side and an implementation program on a second roadside unit side. For implementation of the IoV message exchange method, refer to subsequent embodiments.

The processor 602 may be a general-purpose processor, for example, a CPU. The processor 602 may also be a hardware chip. The hardware chip may be one or a combination of the following: an ASIC, an FPGA, or a CPLD. Alternatively, the processor 602 may be a combination of the foregoing processors. The processor 602 may process data received by the communications component 601, and the processor 602 may further process data that is to be sent to the communications component 601 for transmission over a wireless transmission medium.

The processor 602 may be configured to read and execute a computer-readable instruction. Specifically, the processor 602 may be configured to: invoke a program stored in the memory 603, for example, an implementation program, on a roadside unit side, of an IoV message exchange method and execute an instruction included in the program.

The processor 602 is configured to determine, based on an IoV message received by the communications component 601 and a forwarding indication, whether to forward the IoV message. For a manner in which the processor 601 determines whether to forward the IoV message, refer to a subsequent embodiment. The processor 602 may be further configured to: when determining to forward the IoV message, add an original timestamp of the IoV message to the IoV message, and forward the IoV message by using the communications component 601. For a concept of the original timestamp, refer to subsequent embodiments.

It should be understood that the roadside unit 60 shown in FIG. 6 is merely an implementation. In actual application, the roadside unit 60 may include more or fewer components. This is not limited in this disclosure.

Based on the vehicle-mounted device, the V2X application server, and the roadside unit that are described in the embodiments in FIG. 4 to FIG. 6, the IoV message exchange method can be implemented. The following describes the IoV message exchange method. For ease of description, in the following embodiments, the V2X application server is briefly described as a server.

In the V2X system, a roadside unit deployed on a roadside may divide a complex road in an urban area into two or more road sections. Roadside units are deployed at one end or two ends of the road sections formed through division. For example, the road in the urban area on which the roadside unit is deployed and the road section formed through dividing by the roadside unit may be shown in FIG. 7. One or more roadside units may be deployed on the road in the urban area. The plurality of roadside units may divide the road into a plurality of road sections. Each road may include a plurality of road sections. On a road in the urban area on which more than two roadside units are deployed, roadside units are deployed on ends of a non-edge road section 72. The roadside units at the two ends of the road section 72 are two adjacent roadside units. A coverage area 71 of the two adjacent roadside units and the road section 72 between the two adjacent roadside units may be considered as a roadside unit deployment area. Roadside unit deployment areas may overlap with each other, and a plurality of roadside unit deployment areas may basically cover all roads in the urban area. The coverage area of the roadside unit is a circular area or an approximately circular area formed by using a coverage radius of the roadside unit. The coverage radius of the roadside unit is used to indicate a wireless communication capability of the roadside unit, in other words, a longest distance over which a wireless signal can be sent by the roadside unit, or a distance of receiving a farthest radio signal by the roadside unit.

Figure 7:
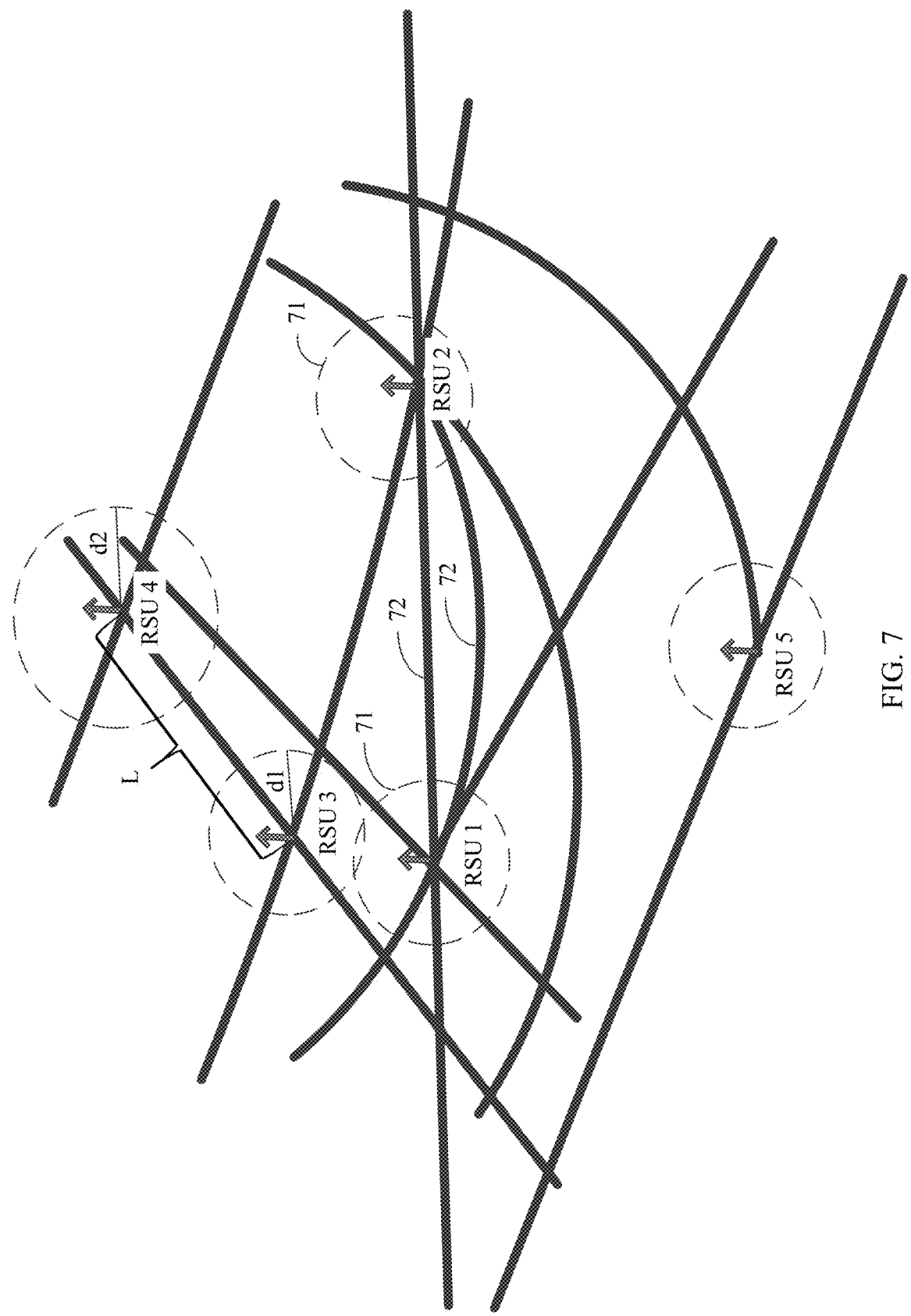
FIG. 7 is a schematic diagram of a road and a road section in an urban area.

It can be learned from FIG. 7 that all roads in the urban area may include road sections, and a procedure of determining a message sending policy of a vehicle-mounted device on each road section is the same. Therefore, in the following embodiments, one of the road sections is used for description.

1. A process of sending a downlink IoV message is a process in which a server sends an IoV message to a vehicle-mounted device on a road section.

Figure 8:
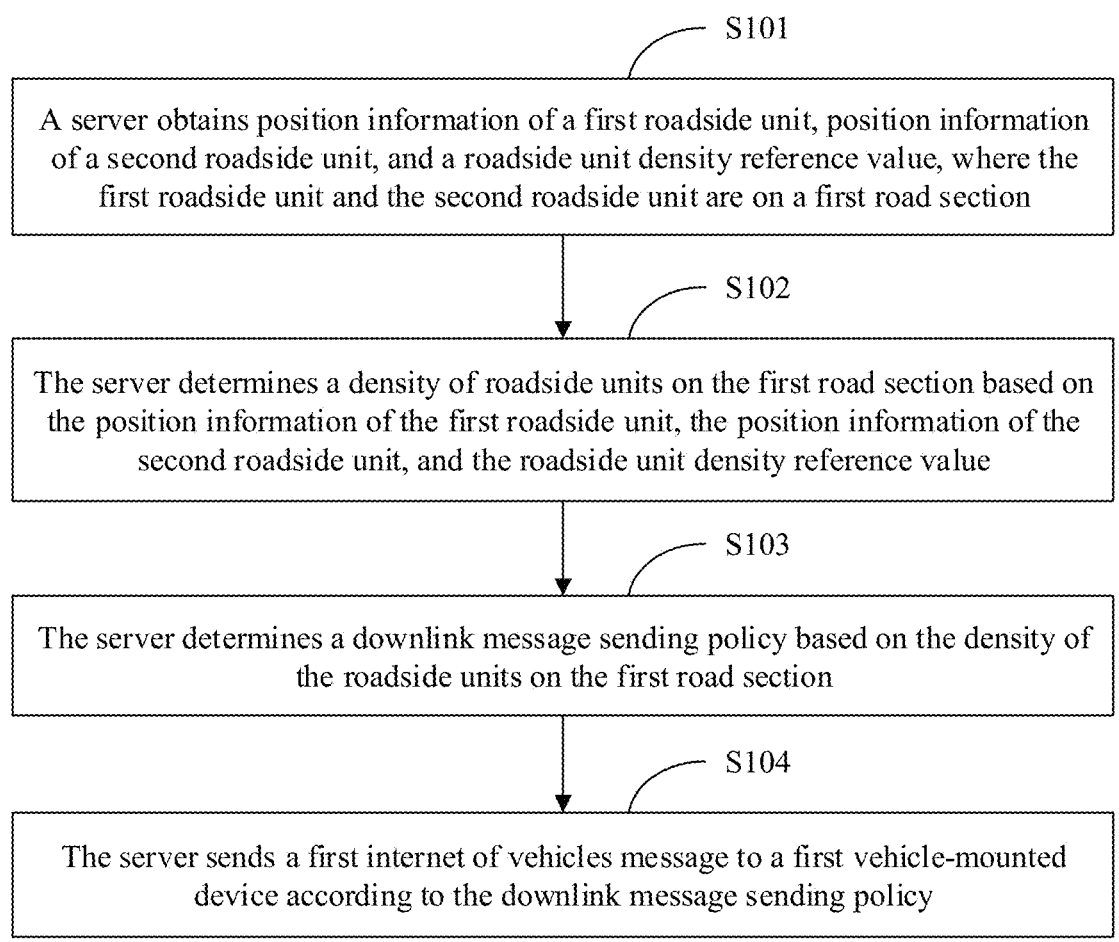
FIG. 8 is a schematic flowchart of an IoV message exchange method.

FIG. 8 is a schematic flowchart of an IoV message exchange method. As shown in FIG. 8, the method includes the following steps.

S101: A server obtains position information of a first roadside unit, position information of a second roadside unit, and a roadside unit density reference value, where the first roadside unit and the second roadside unit are on a first road section.

S102: The server determines a density of roadside units on the first road section based on the position information of the first roadside unit and the position information of the second roadside unit and the roadside unit density reference value.

S103: The server determines a downlink message sending policy based on the density of the roadside units on the first road section.

S104: The server sends a first IoV message to a first vehicle-mounted device according to the downlink message sending policy.

The first roadside unit and the second roadside unit in the foregoing steps S101 and S102 are two adjacent roadside units. The first road section is a road section between the first roadside unit and the second roadside unit. Specifically, a relationship between the first road section, the first roadside unit, and the second roadside unit may be shown in FIG. 7. The first roadside unit and the second roadside unit may be an RSU 1 and an RSU 2 in FIG. 7 respectively, and the first road section may be the road section 72 in FIG. 7. The first roadside unit and the second roadside unit are located at two ends of the first road section.

The position information of the first roadside unit and the position information of the second roadside unit involved in the foregoing steps S101 and S102 may have the following several cases.

1. The position information of the first roadside unit and the position information of the second roadside unit may be absolute natural geographical position information of the first roadside unit and absolute natural geographical position information of the second roadside unit, namely, longitude information and latitude information of the first roadside unit, and longitude information and latitude information of the second roadside unit. For example, the position information of the first roadside unit is a longitude W1 and a latitude N1, and the position information of the second roadside unit is a longitude W2 and a latitude N2.

2. The position information of the first roadside unit and the position information of the second roadside unit may be name information of geographical positions of the first roadside unit and the second roadside unit, namely, information obtained by positioning the geographical positions of the first roadside unit and the second roadside unit on a map. For example, the position information of the first roadside unit is No. 15, Keyuan Road, Nanshan District, Shenzhen, and the position information of the second roadside unit is No. 9028, Beihuan Avenue, Nanshan District, Shenzhen.

3. The position information of the first roadside unit and the position information of the second roadside unit may be roadside unit position information that is preset for the first roadside unit and the second roadside unit, and the roadside unit position information corresponds to absolute natural geographical position information or geographical name information. For example, the position information of the first roadside unit is roadside unit position information 1, and the roadside unit position information 1 corresponds to the geographical name information, which is No. 111, Liuxian Avenue, Xili Town, Nanshan District, Shenzhen. The position information of the second roadside unit is roadside unit position information 2, and the roadside unit position information 2 corresponds to the geographical name information, which is No. 20, Shennan Avenue, Futian District, Shenzhen.

This is not limited to the description herein. In an optional implementation, there may be another case for the position information of the first roadside unit and the position information of the second roadside unit.

The server may obtain the position information of the first roadside unit and the position information of the second roadside unit in the following manners.

In a first manner, when a roadside unit is deployed on a roadside, position information of the roadside unit may be preset on the server. In this case, the server may obtain the position information of the first roadside unit and the position information of the second roadside unit from a storage position of position information of roadside units.

In a second manner, the server may separately send an information obtaining request to the first roadside unit and the second roadside unit, to request to obtain the position information of the first roadside unit and the position information of the second roadside unit. The server may obtain the position information of the first roadside unit and the position information of the second roadside unit based on responses respectively returned by the first roadside unit and the second roadside unit. Optionally, the server may further add an indication for obtaining a coverage radius and/or a roadside unit identifier to the information obtaining request, to request to obtain coverage radii and/or roadside unit identifiers of the first roadside unit and the second roadside unit.

In a third manner, a roadside unit may actively report position information of the roadside unit to the server. In this case, the server may obtain the position information of the first roadside unit and the position information of the second roadside unit based on position information reported by the first roadside unit and position information reported by the second roadside unit. Optionally, the roadside unit may further actively report a roadside unit identifier of the roadside unit and/or a coverage radius of the roadside unit to the server. The server may obtain roadside unit identifiers and/or coverage radii of the first roadside unit and the second roadside unit based on a roadside unit identifier and/or a coverage radius reported by the first roadside unit and a roadside unit identifier and/or a coverage radius reported by the second roadside unit.

Optionally, the server may further obtain the position information of the first roadside unit and the position information of the second roadside unit in combination with the foregoing three manners. For example, the server may first obtain the position information of the first roadside unit and the position information of the second roadside unit locally (in other words, from the storage position of the position information of the roadside units). When the positions of the first roadside unit and the second roadside unit are not obtained, the server may separately send the information obtaining request to the first roadside unit and the second roadside unit, to request to obtain the position information of the first roadside unit and the position information of the second roadside unit. For another example, when the position information reported by the first roadside unit and the second roadside unit is not obtained, the server may locally obtain the position information of the first roadside unit and the position information of the second roadside unit. When the position information reported by the first roadside unit or the second roadside unit is obtained, the server determines the position information reported by the first roadside unit or the second roadside unit as the obtained position information of the first roadside unit or the second roadside unit, and locally updates the position information of the first roadside unit or the second roadside unit based on the obtained position information of the first roadside unit or the obtained position information of the second roadside unit.

The roadside unit density reference value involved in the foregoing steps S101 and S102 is a reference value used to measure density between the first roadside unit and the second roadside unit.

In a possible implementation, the roadside unit density reference value may be a reference value related to a safe driving distance. Specifically, the roadside unit density reference value may include a first safe driving distance and a second safe driving distance. The first safe driving distance is a safe driving distance of a vehicle-mounted device traveling on a road section in an urban area when a vehicle flow of the road section in the urban area is in an off-peak period. The second safe driving distance is a safe driving distance of the vehicle-mounted device traveling on a high-speed road section when a vehicle flow of the high-speed road section is in the off-peak period.

The following describes the first safe driving distance and the second safe driving distance.

A minimum safe distance formula obtained according to automobile braking mechanics is:

$$S = \Delta V \times \left(T + t1 + \frac{1}{2}t2\right) + \frac{\Delta V^2}{2a_s} + d_0.$$

$\Delta V$ is a speed difference between a rear vehicle and a front vehicle. T is a driver response time period, t1 is a braking coordination time period. t2 is a deceleration increase time period, which is generally 0.1 seconds (s) to 0.2 s. as is a maximum deceleration of a vehicle. d0 is a safe distance when the vehicle is stopped, namely, a safe distance between the vehicle and the front vehicle after the vehicle stops, and the value of d0 is generally from 2 m to 5 m.

The first safe driving distance is a minimum safe distance obtained by substituting, into the foregoing formula, a speed difference corresponding to a road section in the urban area when a vehicle flow is in an off-peak period. In specific implementation, a speed difference between a speed of a vehicle at a rear position and a speed of a vehicle at a front position in two adjacent vehicles traveling on a road section in the urban area may be counted when the vehicle flow is in the off-peak period, to obtain a large amount of data of a speed difference between two adjacent vehicles. Then a speed difference corresponding to the road section in the urban area when the vehicle flow is in the off-peak period is determined based on the large amount of data of the speed difference between two adjacent vehicles. The speed difference may be an average value of the large amount of data of the speed difference.

The second safe driving distance is a minimum safe distance obtained by substituting, into the foregoing formula, a speed difference corresponding to the high-speed road section when the vehicle flow is in the off-peak period. In specific implementation, a speed difference between a speed of a vehicle at a rear position and a speed of a vehicle at a front position in two adjacent vehicles traveling on the high-speed road section may be counted when the vehicle flow is in the off-peak period, to obtain a large amount of data of a speed difference between two adjacent vehicles. Then a speed difference corresponding to the high-speed road section when the vehicle flow is in the off-peak period is determined based on the large amount of data of the speed difference between two adjacent vehicles. The speed difference may be an average value of the large amount of data of the speed difference.

In another possible implementation, the roadside unit density reference value may also be a reference value related to a vehicle flow peak value. Specifically, the roadside unit density reference value may include a first vehicle flow peak distance and a second vehicle flow peak distance. The first vehicle flow peak distance is a product of a first coefficient and a first coverage distance, and the second vehicle flow peak distance is a product of a second coefficient and a first coverage distance. The first coefficient is a ratio of a vehicle flow high-peak value of the first road section to a vehicle flow off-peak value of the first road section. The second coefficient is a ratio of a vehicle flow low-peak value of the first road section to the vehicle flow off-peak value of the first road section. The first coverage distance is a sum of a coverage radius of the first roadside unit and a coverage radius of the second roadside unit. For example, if the first roadside unit and the second roadside unit are respectively an RSU 3 and an RSU 4 in FIG. 7, the first coverage distance is d1+d2.

Specifically, a preset duration is used as a period. A vehicle flow high-peak value, a vehicle flow low-peak value, and a vehicle flow off-peak value of the first road section in the period may be separately determined, and then statistics about vehicle flow high-peak values, vehicle flow low-peak values, and vehicle flow off-peak values that correspond to a plurality of periods are collected. Average values of a vehicle flow high-peak value, a vehicle flow low-peak value, and a vehicle flow off-peak value that correspond to the plurality of periods are respectively determined as the vehicle flow high-peak value, the vehicle flow low-peak value, and the vehicle flow off-peak value of the first road section. For example, one week is used as a period. A vehicle flow high-peak value, a vehicle flow low-peak value, and a vehicle flow off-peak value of the first road section in one week may be separately determined, and then statistics about the vehicle flow high-peak value, the vehicle flow low-peak value, and the vehicle flow off-peak value that correspond to each week in 10 weeks are collected. A value obtained by dividing a sum of the weekly corresponding vehicle flow high-peak values by 10 is determined as the vehicle flow high-peak value of the first road section. A value obtained by dividing a sum of the weekly corresponding vehicle flow low-peak values by 10 is determined as the vehicle flow low-peak value of the first road section. A value obtained by dividing a sum of the weekly corresponding vehicle flow off-peak values by 10 is determined as the vehicle flow off-peak value of the first road section.

Specifically, a time period may also be used as a statistical period, and a vehicle flow high-peak value, a vehicle flow low-peak value, and a vehicle flow off-peak value of the first road section in the time period are determined as the vehicle flow high-peak value, the vehicle flow low-peak value, and the vehicle flow off-peak value of the first road section. For example, a time period from January to December may be used as the statistical period, and a vehicle flow high-peak value, a vehicle flow low-peak value, and a vehicle flow off-peak value of the first road section in the time period from January to December may be determined as the vehicle flow high-peak value, the vehicle flow low-peak value, and the vehicle flow off-peak value of the first road section.

The server may obtain the roadside unit density reference value in the following manner.

1. The roadside unit density reference values are the first safe driving distance and the second safe driving distance.

(1a) The speed difference corresponding to the road section in the urban area and the speed difference corresponding to the high-speed road section, which are determined in the foregoing manner, are preset on the server. The server may obtain, from the server, the speed difference corresponding to the road section in the urban area and the speed difference corresponding to the high-speed road section, and then calculate the first safe driving distance and the second safe distance based on the minimum safe distance formula, the speed difference corresponding to the road section in the urban area, and the speed difference corresponding to the high-speed road section.

(1b) The first safe driving distance and the second safe driving distance that are determined in the foregoing manner are preset on the server. The server may obtain the first safe driving distance and the second safe driving distance from the server.

(1c) The speed difference corresponding to the road section in the urban area and the speed difference corresponding to the high-speed road section, which are determined in the foregoing manner, are stored on another server. The server may obtain, from the another server through an interface on the another server, the speed difference corresponding to the road section in the urban area and the speed difference corresponding to the high-speed road section, and then obtain the first safe driving distance and the second safe driving distance through calculation in the manner (1a).

(1d) The first safe driving distance and the second safe driving distance that are determined in the foregoing manner are stored on another server. The server may obtain the first safe driving distance and the second safe driving distance from the another server through an interface on the another server.

This disclosure is not limited to the foregoing several manners. In an optional implementation, the server may further obtain the first safe driving distance and the second safe driving distance in another manner. For example, the server may further directly determine, in the foregoing manner of determining the speed difference corresponding to the road section in the urban area and the speed difference corresponding to the high-speed road section, the speed difference corresponding to the road section in the urban area and the speed difference corresponding to the high-speed road section, and then obtain the first safe driving distance and the second safe driving distance through calculation based on the minimum safe distance formula, the speed difference corresponding to the road section in the urban area, and the speed difference corresponding to the high-speed road section.

2. The roadside unit density reference values are the first vehicle flow peak distance and the second vehicle flow peak distance.

(2a) The vehicle flow high-peak value, the vehicle flow low-peak value, and the vehicle flow off-peak value of the first road section that are determined in the foregoing manner are preset on the server. The server may obtain the vehicle flow high-peak value, the vehicle flow low-peak value, and the vehicle flow off-peak value of the first road section from the server, calculate the first coefficient based on the vehicle flow high-peak value and the vehicle flow off-peak value of the first road section, calculate the second coefficient based on the vehicle flow low-peak value and the vehicle flow off-peak value of the first road section, calculate the first coverage distance based on the coverage radii of the first roadside unit and the second roadside unit, determine a product of the first coefficient and the first coverage distance as the first vehicle flow peak distance, and determine a product of the second coefficient and the first coverage distance as the second vehicle flow peak distance. The coverage radii of the first roadside unit and the second roadside unit may be stored on the server, or may be separately reported by the first roadside unit and the second roadside unit, or may be separately requested and obtained by the server from the first roadside unit and the second roadside unit.

(2b) The first coefficient and the second coefficient that are determined in the foregoing manner are preset on the server. The server may calculate the first coverage distance based on the coverage radii of the first roadside unit and the second roadside unit, determine the product of the first coefficient and the first coverage distance as the first vehicle flow peak distance, and determine the product of the second coefficient and the first coverage distance as the second vehicle flow peak distance.

(2c) The vehicle flow high-peak value, the vehicle flow low-peak value, and the vehicle flow off-peak value of the first road section that are determined in the foregoing manner are stored on another server. The server may obtain the vehicle flow high-peak value, the vehicle flow low-peak value, and the vehicle flow off-peak value of the first road section from the another server through an interface on the another server, and then determine the first vehicle flow peak distance and the second vehicle flow peak distance in the manner (2a).

(2d) The first coefficient and the second coefficient that are determined in the foregoing manner are stored on another server. The server may obtain the first coefficient and the second coefficient from the another server through an interface on the another server, and then determine the first vehicle flow peak distance and the second vehicle flow peak distance in the manner (2b).

Optionally, the coverage radii of the first roadside unit and the second roadside unit in the manners (2a) to (2d) may be obtained by the server from the server, or may be separately reported by the first roadside unit and the second roadside unit, or may be separately requested and obtained by the server from the first roadside unit and the second roadside unit.

This disclosure is not limited to the foregoing several manners. In an optional implementation, the server may further obtain the first vehicle flow peak distance and the second vehicle flow peak distance in another manner. For example, the server may further directly determine the vehicle flow high-peak value, the vehicle flow low-peak value, and the vehicle flow off-peak value of the first road section in the foregoing manner of determining the vehicle flow high-peak value, the vehicle flow low-peak value, and the vehicle flow off-peak value of the first road section, and then determine the first vehicle flow peak distance and the second vehicle flow peak distance in the manner described in the manner (2a).

Specifically, the another server in the manners (1c) to (1d) and (2c) to (2d) may be, for example, a server of an organization that is responsible for controlling a vehicle and a road, such as a vehicle management bureau, a traffic management bureau, or an urban road management department.

The density of the roadside units on the first road section in the steps S102 to S103 may be classified into three levels, which are first density, second density, and third density. The first density is higher than the second density, and the second density is higher than the third density. In other words, roadside units are relatively densely deployed on a road section corresponding to the first density. Roadside units are relatively sparsely deployed on a road section corresponding to the third density. Roadside units are deployed relatively evenly on a road section corresponding to the second density.

The following describes a manner of determining the density of the roadside units on the first road section, in other words, a manner of determining a deployment status of the roadside units on the first road section.

1. The roadside unit density reference values are the first safe driving distance and the second safe driving distance, a manner in which the server determines the density of the roadside units on the first road section based on the position information of the first roadside unit, the position information of the second roadside unit, and the roadside unit density reference value is as follows: If determining, based on the position information of the first roadside unit and the position information of the second roadside unit, that a first distance is greater than the first safe driving distance, the server determines that the density of the roadside units on the first road section is the third density. If determining, based on the position information of the first roadside unit and the position information of the second roadside unit, that the first distance is less than or equal to the first safe driving distance and is greater than or equal to the second safe driving distance, the server determines that the density of the roadside units on the first road section is the second density. If determining, based on the position information of the first roadside unit and the position information of the second roadside unit, that the first distance is less than the second safe driving distance, the server determines that the density of the roadside units on the first road section is the first density.

Herein, the first distance is a straight-line distance between the first roadside unit and the second roadside unit. For example, the first roadside unit and the second roadside unit are an RSU 3 and an RSU 4 in FIG. 7 respectively, and the first distance is L in FIG. 7. In specific implementation, the first distance may be determined based on the position information of the first roadside unit and the position information of the second roadside unit.

Specifically, if the position information of the first roadside unit and the position information of the second roadside unit are the absolute natural geographical position information of the first roadside unit and the absolute natural geographical position information of the second roadside unit, the server may calculate the first distance according to a haversine formula or a great circle distance formula. If the position information of the first roadside unit and the position information of the second roadside unit are the name information names of the geographical positions of the first roadside unit and the second roadside unit, the server may determine the first distance through an interface of a map server. The map server may be, for example, a server of AutoNavi map or a server of Baidu map. If the position information of the first roadside unit and the position information of the second roadside unit are the roadside unit position information that is preset for the first roadside unit and the roadside unit position information that is preset for the second roadside unit, the server may convert the roadside unit position information into the absolute natural geographical position information or the geographical names based on a correspondence between the roadside unit position information and the absolute natural geographical position information or the geographical name information, and then determine the first distance in a corresponding manner.

It can be learned from a road section property that the speed difference between the two adjacent vehicles on the high-speed road section is less than the speed difference between the two adjacent vehicles on the road section in the urban area. It can be learned according to the minimum safe distance formula that the first safe driving distance corresponding to the road section in the urban area is greater than the second safe driving distance corresponding to the high-speed road section. If the first distance is less than the second safe driving distance, it indicates that a distance between the first roadside unit and the second roadside unit is less than a minimum safe distance between the two vehicles on the high-speed road, and the first roadside unit and the second roadside unit may completely cover the first road section. When a distance between the two vehicles is less than the minimum safe distance, a warning message delivered by using a roadside unit within the minimum safe distance may be received by the vehicles, and the roadside units are deployed relatively densely. If the first distance is greater than the first safe driving distance, it indicates that the distance between the first roadside unit and the second roadside unit is greater than a minimum safe distance between the two vehicles on the road in the urban area, and the first roadside unit and the second roadside unit may not completely cover the first road section. When the distance between two vehicles is less than the minimum safe distance, the warning message delivered by using the roadside unit may not be received by the vehicles, and the roadside unit is relatively sparsely deployed. If the first distance is greater than or equal to the second safe driving distance, and is less than or equal to the first safe driving distance, it indicates that the distance between the first roadside unit and the second roadside unit is greater than or equal to the minimum safe distance between the two vehicles on the high-speed road, and is less than or equal to the minimum safe distance between the two vehicles on the road in the urban area. The warning message delivered by using the roadside unit may be received by the vehicles, or may not be received by the vehicles, and the roadside units are deployed relatively evenly.

2. The roadside unit density reference values are the first vehicle flow peak distance and the second vehicle flow peak distance, a manner in which the server determines the density of the roadside units on the first road section based on the position information of the first roadside unit, the position information of the second roadside unit, and the roadside unit density reference value is as follows: If determining, based on the position information of the first roadside unit and the position information of the second roadside unit, that the first distance is greater than the first vehicle flow peak distance, the server determines that the density of the roadside units on the first road section is the third density. If determining, based on the position information of the first roadside unit and the position information of the second roadside unit, that a first distance is less than or equal to a first vehicle flow peak distance and is greater than or equal to a second vehicle flow peak distance, the server determines that the density of the roadside units on the first road section is the second density. If determining, based on the position information of the first roadside unit and the position information of the second roadside unit, that the first distance is less than or equal to a first vehicle flow peak distance, the server determines that the density of the roadside units on the first road section is the third density.

The first vehicle flow peak distance is a product of the first coefficient and the first coverage distance. The second vehicle flow peak distance is a product of the second coefficient and the first coverage distance. The first coverage distance is a sum of coverage radii of the first roadside unit and the second roadside unit. The first coefficient is a ratio of a vehicle flow high-peak value of the first road section to a vehicle flow off-peak value of the first road section, and the first coefficient is a value greater than 1. The second coefficient is a ratio of a vehicle flow low-peak value of the first road section to the vehicle flow off-peak value of the first road section, and the second coefficient is a value less than 1. If the first distance is greater than the first vehicle flow peak distance, it indicates that a distance between the first roadside unit and the second roadside unit is greater than a sum of coverage radii of the first roadside unit and the second roadside unit, and the first roadside unit and the second roadside unit cannot completely cover the first road section. Roadside units are sparsely deployed. If the first distance is less than the second vehicle flow peak distance, it indicates that the distance between the first roadside unit and the second roadside unit is less than the sum of the coverage radii of the first roadside unit and the second roadside unit. The first roadside unit and the second roadside unit may completely cover the first road section, and roadside units are densely deployed. If the first distance is greater than or equal to the second vehicle flow peak distance, and is less than or equal to the first vehicle flow peak distance, it indicates that the distance between the first roadside unit and the second roadside unit may be the sum of the coverage radii of the first roadside unit and the second roadside unit, or may be less than the sum of the coverage radii of the first roadside unit and the second roadside unit. The roadside units are deployed relatively evenly.

The downlink message sending policy in the foregoing steps S103 and S104 is a downlink message sending policy corresponding to the first road section, in other words, a policy of sending, by the server, a downlink IoV message to a vehicle-mounted device on the first road section. The following uses the first vehicle-mounted device as the vehicle-mounted device on the first road section to describe a case in which the downlink message sending policy is determined and the server sends the downlink IoV message.

Specifically, the downlink message sending policy determined by the server based on the density of the roadside units on the first road section may have the following several cases:

1. If the density of the roadside units on the first road section is the first density, in other words, the roadside units are deployed relatively densely, the server determines that the downlink message sending policy is: sending the IoV message to the first roadside unit and the second roadside unit, and indicating the first roadside unit and the second roadside unit to forward the IoV message to the first vehicle-mounted device.

Figure 9A:
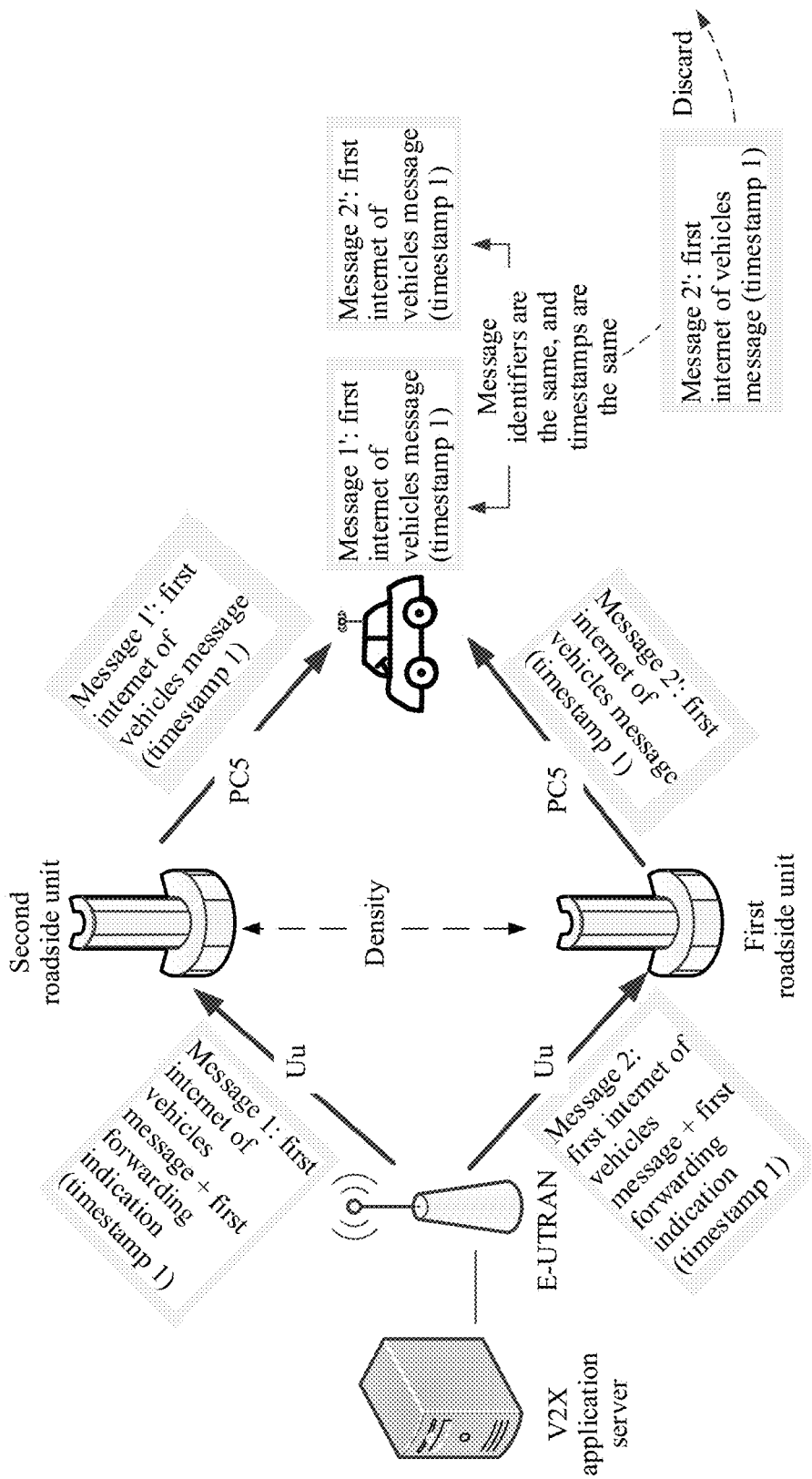
FIG. 9A to FIG. 9E are schematic diagrams of sending, by a server, a downlink IoV message to a vehicle-mounted device.

Correspondingly, a schematic diagram in which the server sends the first IoV message to the first vehicle-mounted device according to the downlink message sending policy may be shown in FIG. 9A. The server separately sends the first IoV message to the first roadside unit and the second roadside unit, and sends a first forwarding indication to the first roadside unit and the second roadside unit. The first forwarding indication is used to indicate that the first roadside unit and the second roadside unit forward the first IoV message. After receiving the first IoV message, the first roadside unit and the second roadside unit separately add an original timestamp of the first IoV message to the first IoV message based on the first forwarding indication, and then forward the first IoV message to the first vehicle-mounted device. After receiving the first IoV message, the first vehicle-mounted device identifies, based on a message identifier and a timestamp in the first IoV message, whether the first IoV message is received for the first time. If the first IoV message is received for the first time, the first vehicle-mounted device stores the first IoV message. When subsequently receiving a second IoV message whose message identifier and timestamp are the same as the message identifier and timestamp of the first IoV message, the first vehicle-mounted device discards the second IoV message. Herein, the original timestamp of the first IoV message is a timestamp carried in the first IoV message when the server sends the first IoV message. The message identifier is an identifier allocated by the server to the first IoV message, and the message identifier is used to uniquely indicate the first IoV message in the downlink IoV message sent by the server.

2. If the density of the roadside units on the first road section is the second density, in other words, the roadside units are deployed relatively evenly, the server determines that the downlink message sending policy is one of the following policies.

(1) The server sends an IoV message to a device in a first multicast group, and indicates the first roadside unit and the second roadside unit to forward the IoV message to the first vehicle-mounted device, where the first multicast group includes the first roadside unit, the second roadside unit, and the first vehicle-mounted device, in other words, the downlink IoV message is sent to the first vehicle-mounted device in a multicast manner.

(2) The server separately sends an IoV message to the first vehicle-mounted device, the first roadside unit, and the second roadside unit in a unicast manner, and indicates the first roadside unit and the second roadside unit to forward the IoV message to the first vehicle-mounted device.

Figure 9B:
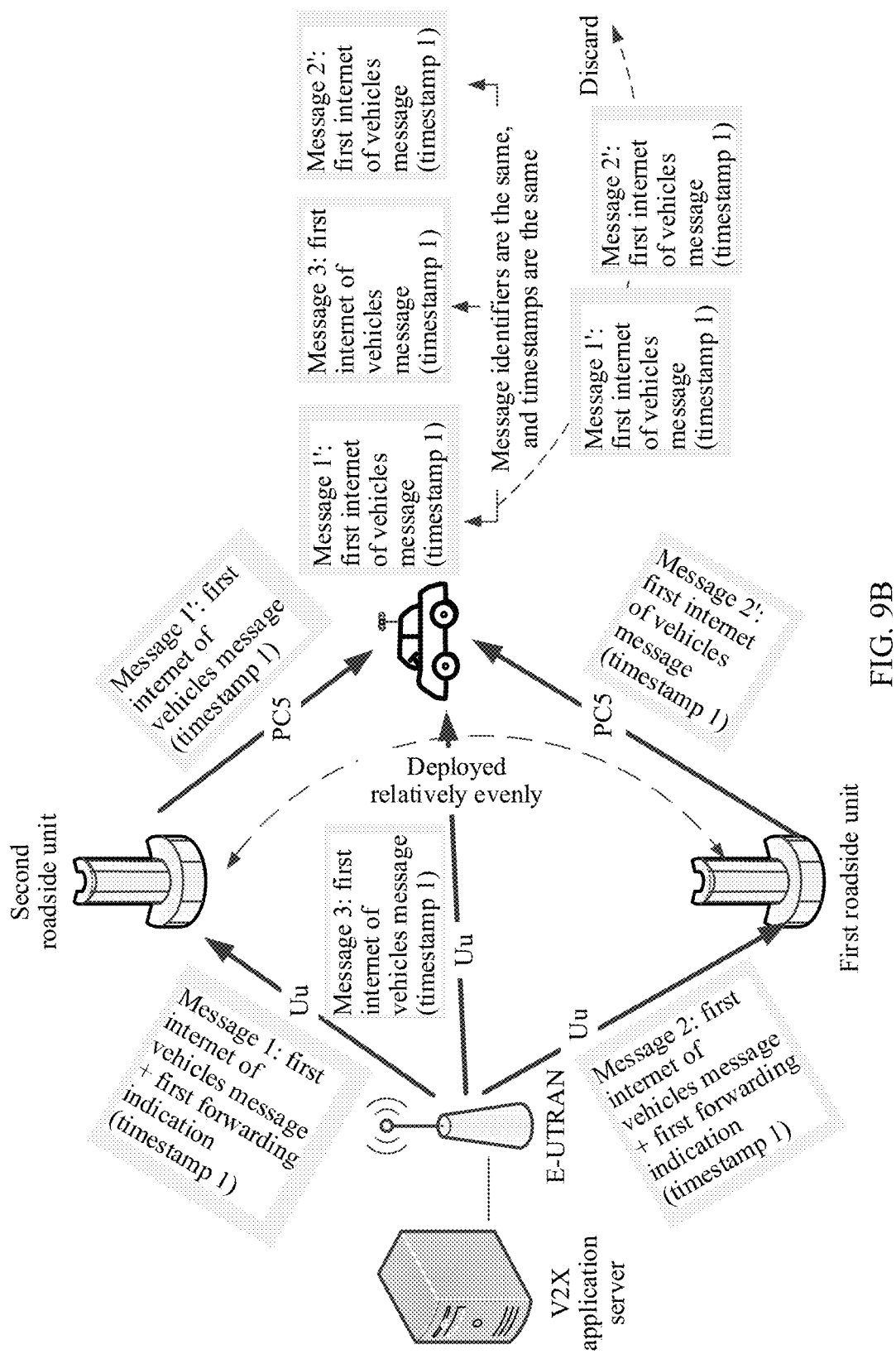

Correspondingly, a schematic diagram in which the server sends the first IoV message to the first vehicle-mounted device according to the downlink message sending policy may be shown in FIG. 9B. The server separately sends the first IoV message to the first roadside unit, the second roadside unit, and the first vehicle-mounted device, and sends a first forwarding indication to the first roadside unit and the second roadside unit, where the first forwarding indication is used to indicate that the first roadside unit and the second roadside unit forward the first IoV message. After receiving the first IoV message, the first roadside unit and the second roadside unit separately add an original timestamp of the first IoV message to the first IoV message based on the first forwarding indication, and then forward the first IoV message to the first vehicle-mounted device. After receiving the first IoV message, the first vehicle-mounted device identifies, based on a message identifier and a timestamp in the first IoV message, whether the first IoV message is received for the first time. If the first IoV message is received for the first time, the first vehicle-mounted device stores the first IoV message. When subsequently receiving a second IoV message whose message identifier and timestamp are the same as the message identifier and timestamp of the first IoV message, the first vehicle-mounted device discards the second IoV message.

Optionally, in addition to being used to indicate that the first roadside unit and the second roadside unit forward the first IoV message, the first forwarding indication may be further used to indicate that the first roadside unit and the second roadside unit add, to the first IoV message when forwarding the first IoV message, the original timestamp for forwarding the first IoV message.

In the first downlink message sending policy and the second downlink message sending policy, when the roadside units are densely deployed or relatively evenly deployed, the roadside units can be fully utilized by forwarding the IoV message. When the roadside units forward the downlink IoV message, the original timestamp of the downlink IoV message is carried, so that the first vehicle-mounted device can perform de-duplication processing on the downlink IoV message based on the message identifier and the timestamp in the downlink IoV message, to reduce repetition of the downlink IoV message.

3. If the density of the roadside units on the first road section is the third density, in other words, the roadside units are relatively sparsely deployed, the server determines that the downlink message sending policy is one of the following policies.

(1) The server sends an IoV message to the first vehicle-mounted device in the unicast manner.

Figure 9C:
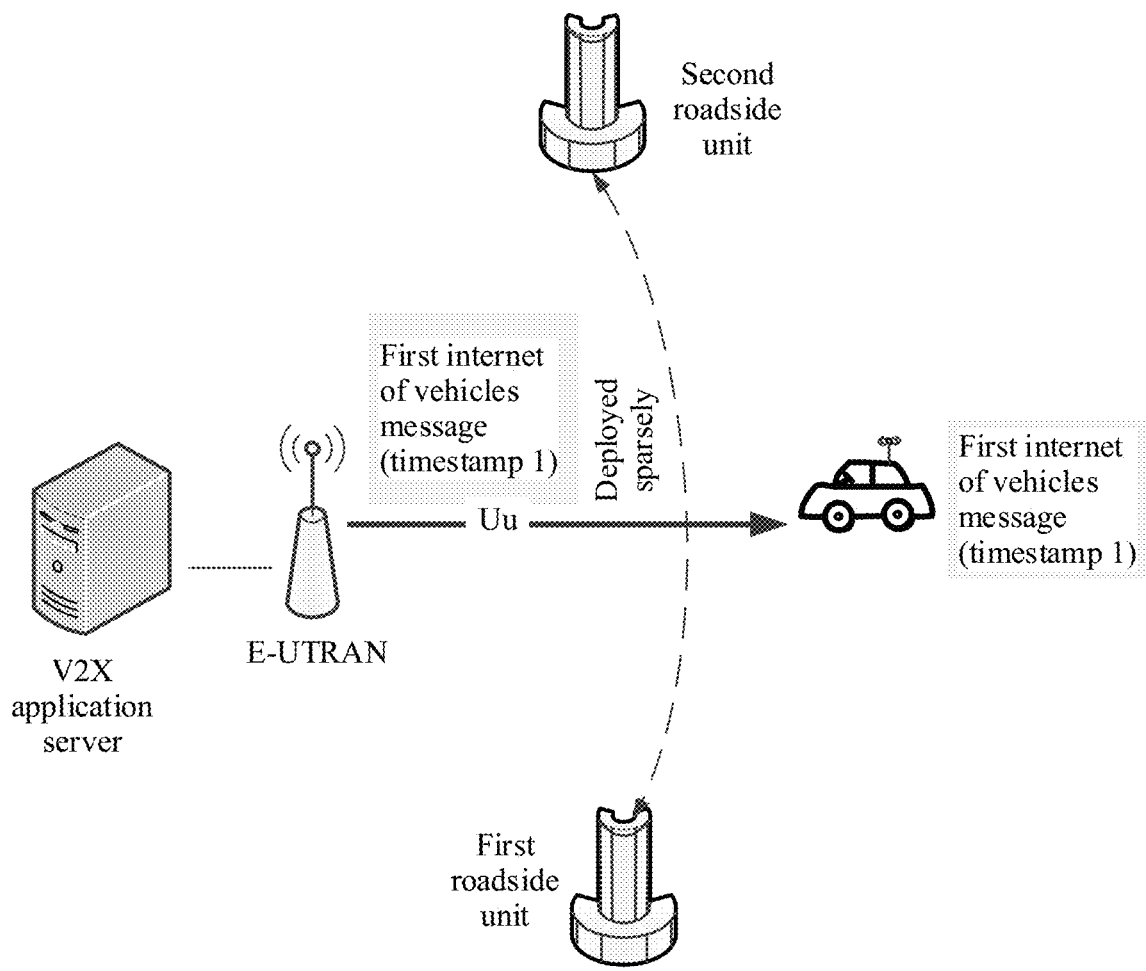

Correspondingly, a schematic diagram in which the server sends the first IoV message to the first vehicle-mounted device according to the downlink message sending policy may be shown in FIG. 9C. The server sends the first IoV message to the first vehicle-mounted device by using an IoV address of the first vehicle-mounted device as a destination address, and the first vehicle-mounted device receives the first IoV message.

(2) The server sends an IoV message to the device in the first multicast group, and indicates the first roadside unit and the second roadside unit to ignore forwarding of the IoV message. The first multicast group includes the first roadside unit, the second roadside unit, and the first vehicle-mounted device, in other words, a downlink IoV message is sent to the first vehicle-mounted device in the multicast manner.

Figure 9D:
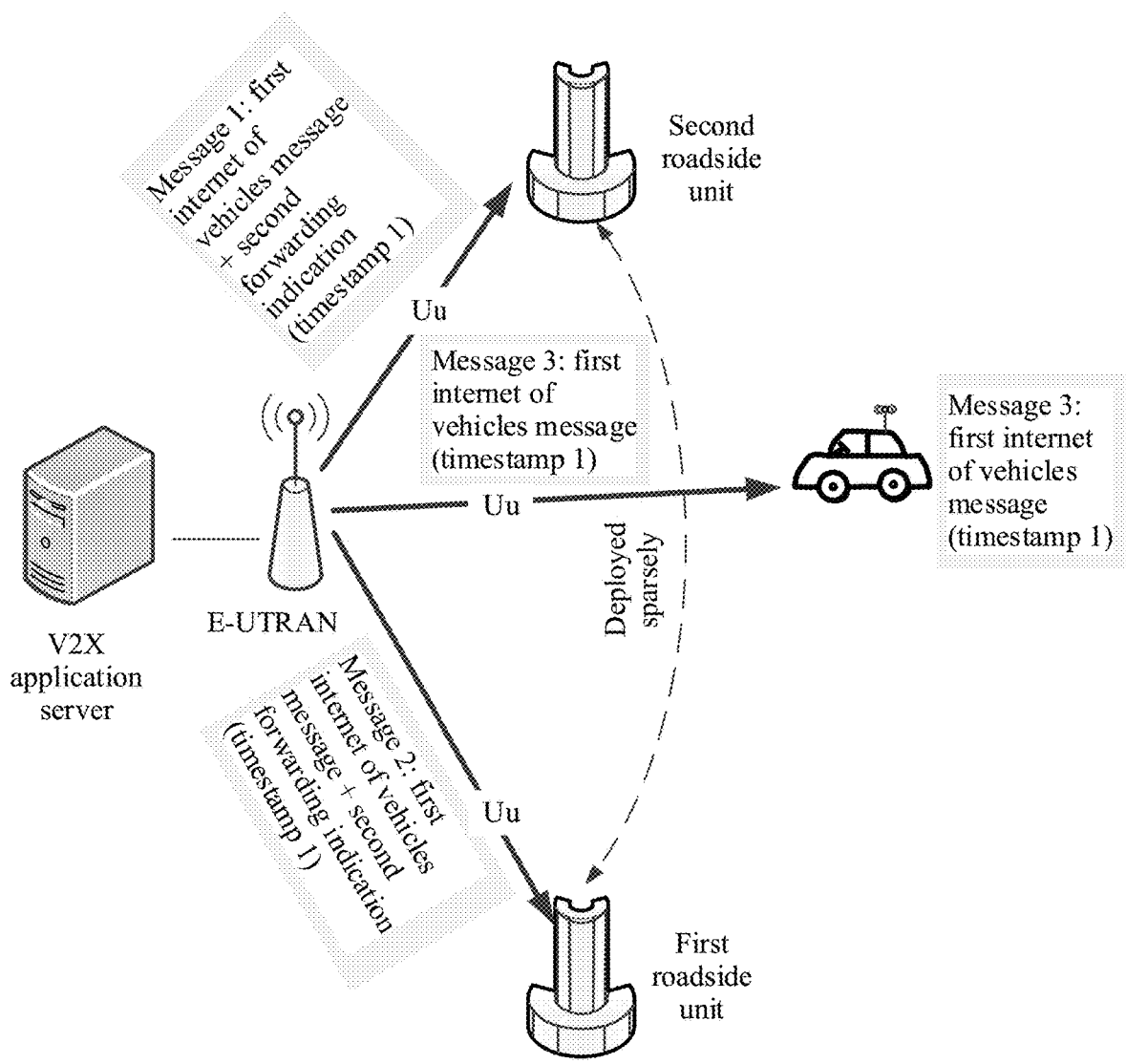

Correspondingly, a schematic diagram in which the server sends the first IoV message to the first vehicle-mounted device according to the downlink message sending policy may be shown in FIG. 9D. The server separately sends the first IoV message to the first roadside unit, the second roadside unit, and the first vehicle-mounted device, and sends a second forwarding indication to the first roadside unit and the second roadside unit, where the second forwarding indication is used to indicate that the first roadside unit and the second roadside unit ignore forwarding of the first IoV message. After receiving the first IoV message, the first side unit and the second side unit ignore forwarding of the first IoV message. Because the first roadside unit and the second roadside unit ignore forwarding of the first IoV message, the first vehicle-mounted device receives only one first IoV message.

(3) The server sends an IoV message to the device in the second multicast group, where the second multicast group includes the first vehicle-mounted device, and the first roadside unit and the second roadside unit are not in the second multicast group, in other words, after the first roadside unit and the second roadside unit are shielded, the downlink IoV message is sent to the first vehicle-mounted device in the multicast manner.

Figure 9E:
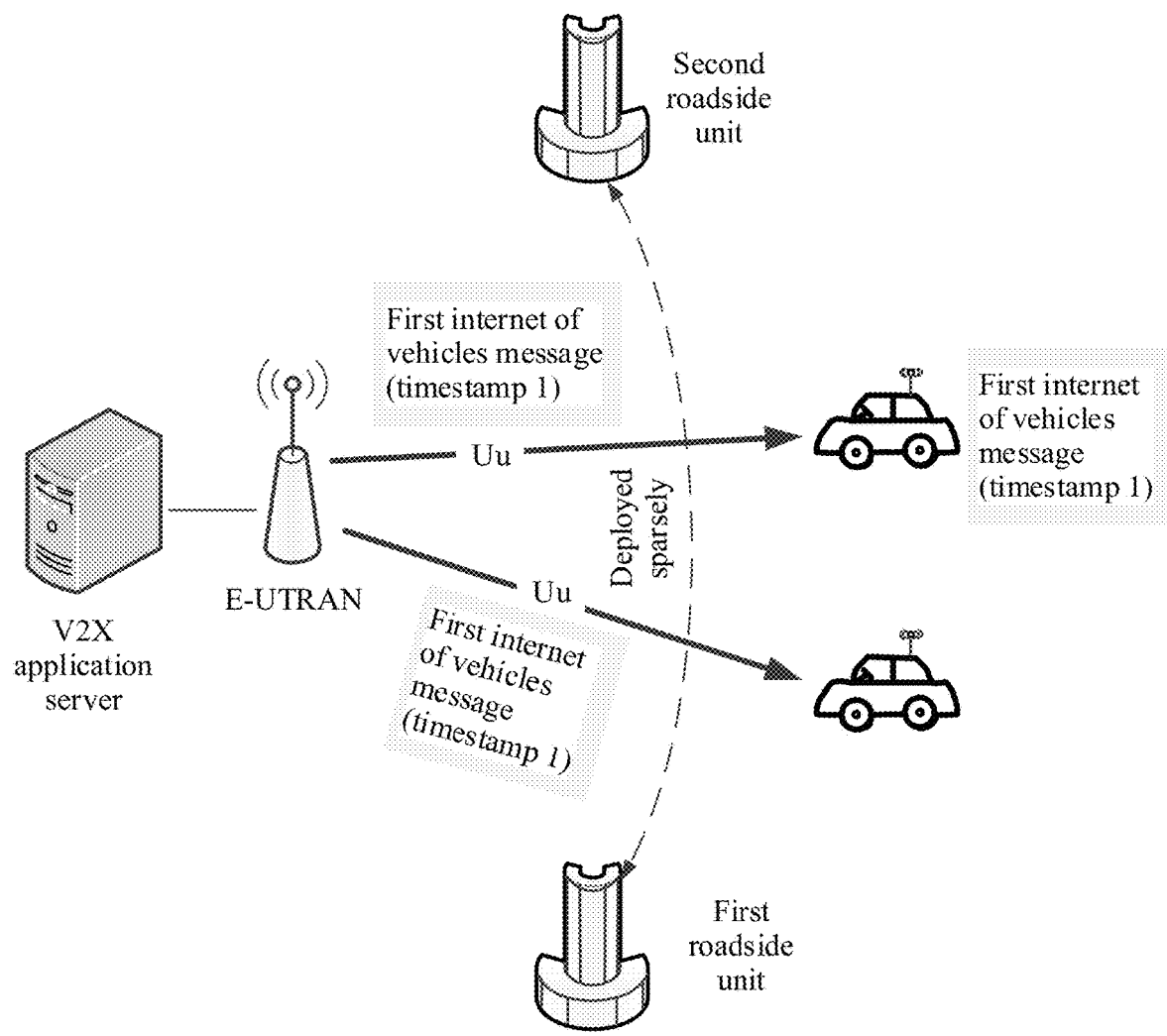

Correspondingly, a schematic diagram in which the server sends the first IoV message to the first vehicle-mounted device according to the downlink message sending policy may be shown in FIG. 9E. The server separately sends the first IoV message to the devices in the second multicast group. Because the first side unit and the second side unit are shielded, and the first IoV message is sent by only one server, the first vehicle-mounted device receives only one first IoV message.

In the foregoing third downlink message sending policy (1) to (3), when the roadside units are relatively sparsely deployed, a loss of the downlink IoV message can be avoided by directly sending the downlink IoV message to the first vehicle-mounted device.

It can be learned from FIG. 9A to FIG. 9E that, compared with a single manner in which the downlink IoV message is sent in FIG. 3A to FIG. 3 C, different downlink message sending policies are set and selected for different road sections with different deployment statuses of the roadside units, to fully utilize the roadside units, and to avoid the repetition and the loss of the downlink IoV message.

2. A process of sending an uplink IoV message is a process of sending an IoV message by a vehicle-mounted device to a server.

Figure 10:
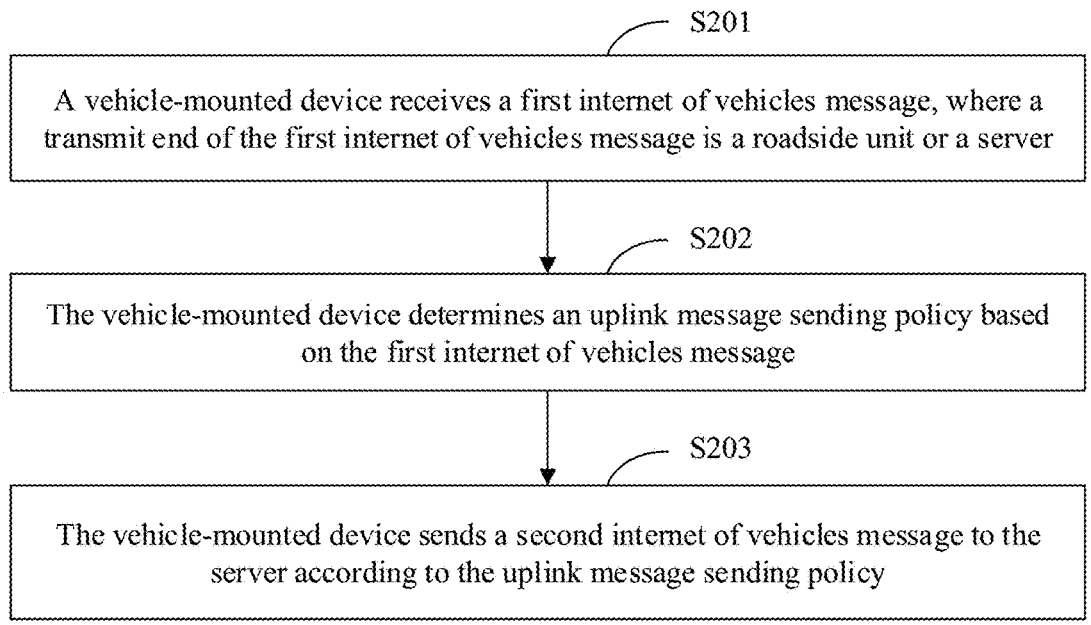
FIG. 10 is a schematic flowchart of an IoV message exchange method.

FIG. 10 is a schematic flowchart of an IoV message exchange method. As shown in FIG. 10, the method includes the following steps.

S201: A vehicle-mounted device receives a first IoV message, where a transmit end of the first IoV message is a roadside unit or a server.

S202: The vehicle-mounted device determines an uplink message sending policy based on the first IoV message.

S203: The vehicle-mounted device sends a second IoV message to the server according to the uplink message sending policy.

The vehicle-mounted device may determine the uplink message sending policy in the following several feasible implementations.

1. The vehicle-mounted device may determine the uplink message sending policy based on the transmit end of the first IoV message. Specifically, if the transmit end of the first IoV message is the roadside unit, the vehicle-mounted device determines that the uplink message sending policy is: sending an IoV message to the roadside unit, and indicating the roadside unit to forward the IoV message to the server. If the transmit end of the first IoV message is not the roadside unit, the vehicle-mounted device determines that the uplink message sending policy is: sending an IoV message to the server in a unicast manner.

Figure 11A:
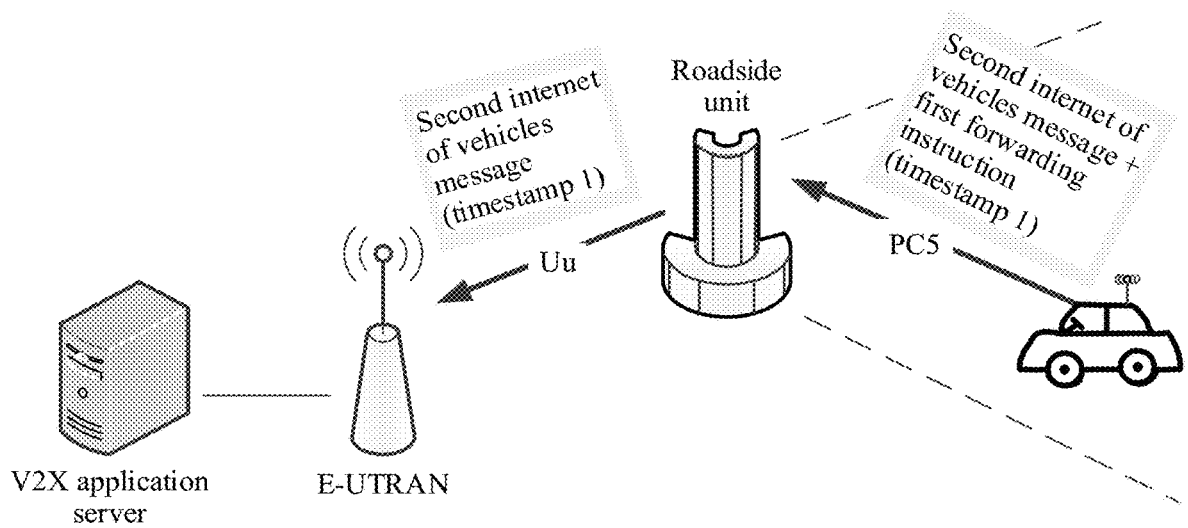
FIG. 11A to FIG. 11F are schematic diagrams of sending, by a vehicle-mounted device, an uplink IoV message to a server.
Figure 11B:
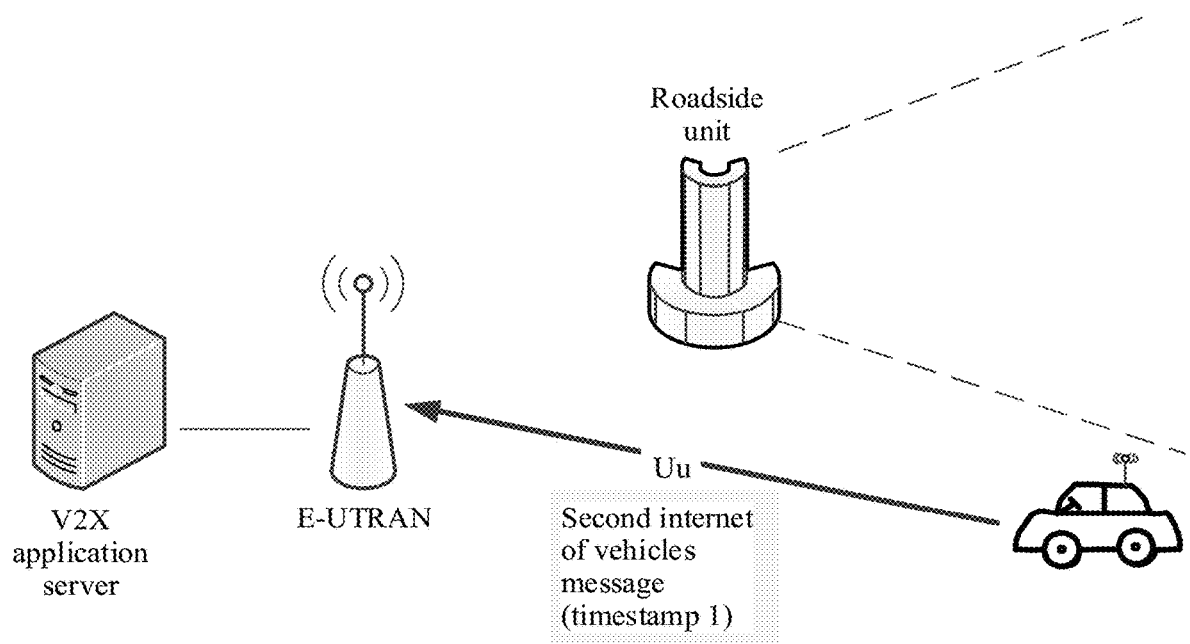

Correspondingly, a schematic diagram in which the vehicle-mounted device sends the second IoV message to the server according to the uplink message sending policy may be shown in FIG. 11A and FIG. 11B. As shown in FIG. 11A, the transmit end of the first IoV message is the roadside unit, and it indicates that the vehicle-mounted device is in a coverage range of the roadside unit. In this case, the vehicle-mounted device sends the second IoV message to the roadside unit, and sends a first forwarding indication to the roadside unit, and the first forwarding indication is used to indicate that the roadside unit forwards the second IoV message. After receiving the second IoV message, the roadside unit adds an original timestamp of the second IoV message to the second IoV message based on the first forwarding indication, and then forwards the second IoV message to the server. Because the second IoV message is sent by only one roadside unit, the server receives only one second IoV message. Herein, the original timestamp of the second IoV message is a timestamp carried in the second IoV message when the vehicle-mounted device sends the second IoV message. As shown in FIG. 11B, if the transmit end of the first IoV message is not the roadside unit, it indicates that the vehicle-mounted device may not be in the coverage range of the roadside unit. In this case, the vehicle-mounted device sends the second IoV message to the server by using an IoV address of the server as a destination address, and the server receives the second IoV message.

Optionally, when the transmit end of the first IoV message is the roadside unit, the first IoV message may be an IoV message separately sent to the vehicle-mounted device, for example, an IoV message forwarded by the server to the vehicle-mounted device by using the roadside unit. Alternatively, the first IoV message may be an IoV broadcast message sent by the roadside unit, the IoV broadcast message may carry a forwarding capability indication, and the forwarding capability indication is used to indicate that the roadside unit has a forwarding capability.

2. The first IoV message carries deployment status information of a first roadside unit, and the first roadside unit is a roadside unit on a traveling path of the vehicle-mounted device or a roadside unit in a coverage range of the server. The vehicle-mounted device may determine the uplink message sending policy based on content of the first IoV message. Specifically, if determining, based on the deployment status information of the first roadside unit, that the vehicle-mounted device is in a coverage range of the first roadside unit, the vehicle-mounted device determines that the uplink message sending policy is: sending an IoV message to the first roadside unit, and indicating the first roadside unit to forward the IoV message to the server. If determining, based on the deployment status information of the first roadside unit, that the vehicle-mounted device is not in the coverage range of the first roadside unit, the vehicle-mounted device determines that the uplink message sending policy is: sending the IoV message to the server in the unicast manner.

Figure 11C:
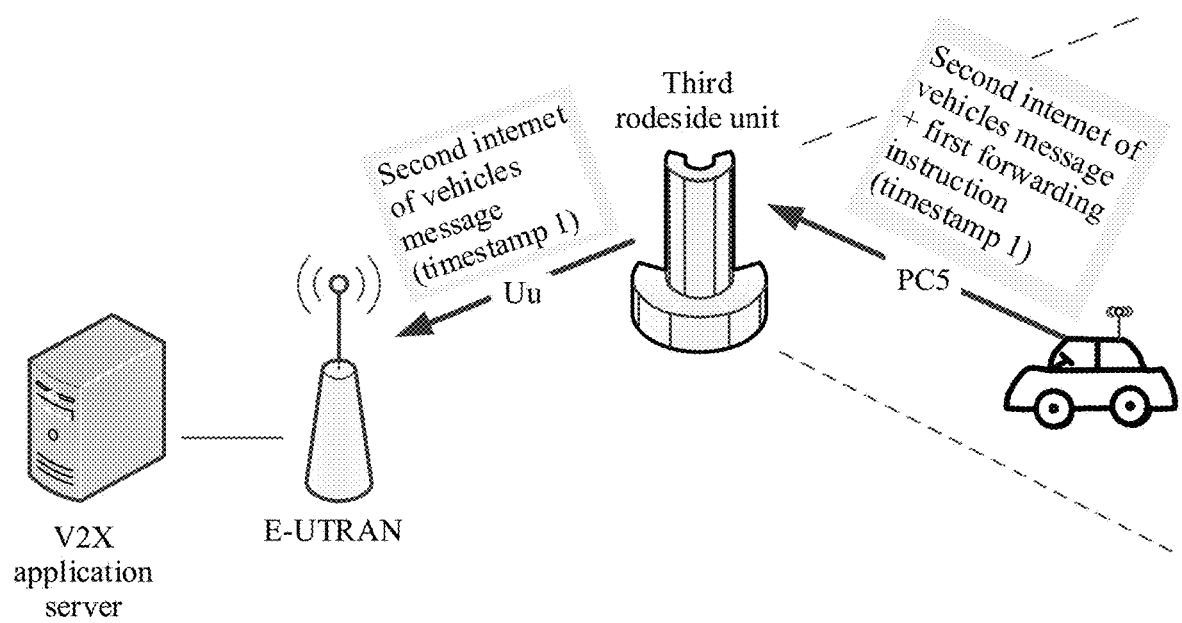
Figure 11D:
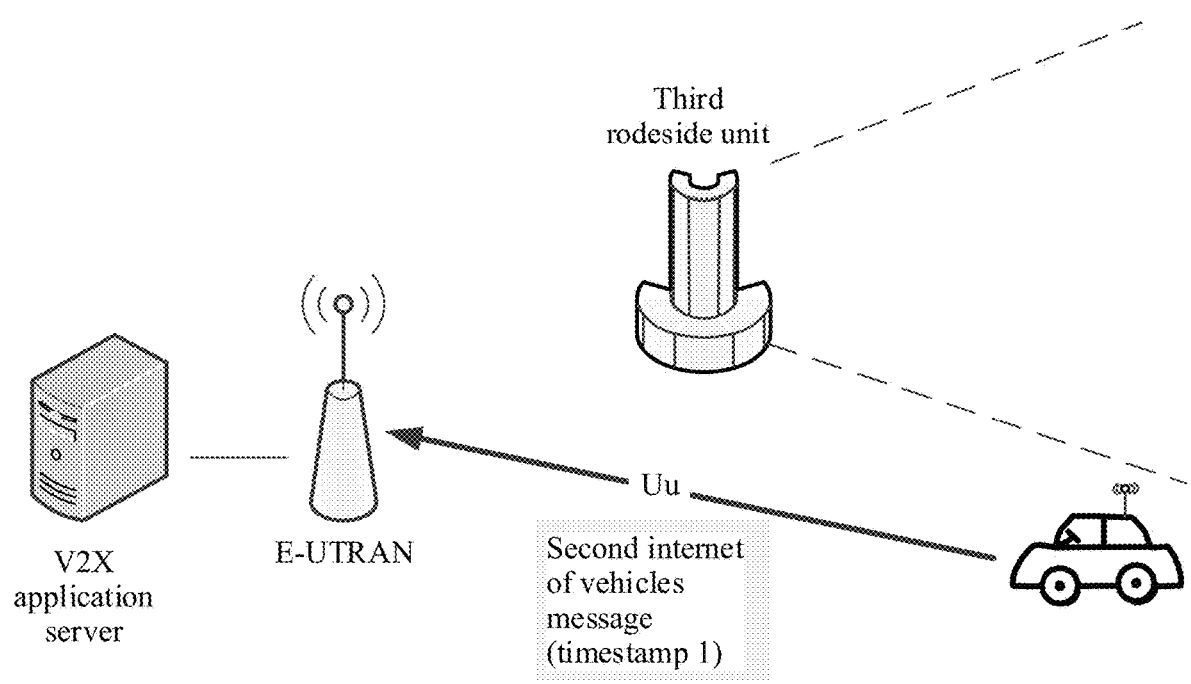

Correspondingly, a schematic diagram in which the vehicle-mounted device sends the second IoV message to the server according to the uplink message sending policy may be shown in FIG. 11C and FIG. 11D. As shown in FIG. 11C, when the vehicle-mounted device is in the coverage range of the first roadside unit, the vehicle-mounted device sends the second IoV message to the first roadside unit, and sends the first forwarding indication to the first roadside unit, where the first forwarding indication is used to indicate that the first roadside unit forwards the second IoV message. After receiving the second IoV message, the first roadside unit adds an original timestamp of the second IoV message to the second IoV message based on the first forwarding indication, and then forwards the second IoV message to the server. Because the second IoV message is sent by only one first roadside unit, the server receives only one second IoV message. As shown in FIG. 11D, when the vehicle-mounted device is not in the coverage range of the first roadside unit, the vehicle-mounted device sends the second IoV message to the server by using the IoV address of the server as the destination address, and the server receives the second IoV message.

In a feasible implementation, when obtaining a driving planning route of the vehicle-mounted device, the server may send the first IoV message to the vehicle-mounted device in the foregoing manner in which the server sends the first IoV message to the first vehicle-mounted device. In other words, the server may determine a downlink message sending policy based on a deployment status of roadside units on a road section on which the vehicle-mounted device is located, and then send the first IoV message to the vehicle-mounted device based on the downlink message sending policy. The deployment status information that is of the first roadside unit and that is carried in the first IoV message is deployment statuses of all roadside units deployed on a road section corresponding to the driving planning route.

In another feasible implementation, the server may send the first IoV message to the vehicle-mounted device in a real-time notification manner based on a geographical position or a geographical area in which the vehicle-mounted device is located. The deployment status information that is of the first roadside unit and that is carried in the first IoV message is a deployment status of roadside units deployed on a road section corresponding to the geographical position or the geographical area. In this implementation, the server may send the first IoV message to the vehicle-mounted device in a broadcast manner, so that all vehicle-mounted devices in the geographical position or the geographical area can determine the uplink message sending policy based on the first IoV message.

Specifically, the deployment status of the first side unit may include information such as a geographical position of the first side unit and a coverage radius of the first side unit. The vehicle-mounted device may determine a distance between the vehicle-mounted device and the first roadside unit based on the geographical position of the first roadside unit and the geographical position of the vehicle-mounted device, and further determine, based on the coverage radius of the first roadside unit, whether the vehicle-mounted device is in the coverage range of the first roadside unit. For example, the vehicle-mounted device determines, based on the geographical position of the first roadside unit and the address position of the vehicle-mounted device, that the distance between the vehicle-mounted device and the first roadside unit is 100 meters. If the coverage radius of the first roadside unit is 200 meters, the vehicle-mounted device determines that the vehicle-mounted device is in the coverage range of the first roadside unit.

In the first uplink message sending policy and the second uplink message sending policy, when the vehicle-mounted device is in the coverage range of the roadside unit, the roadside unit can be fully utilized by forwarding the IoV message. When the vehicle-mounted device is not in the coverage range of the roadside unit, the uplink IoV message is directly sent to the server in a unicast manner, to avoid a loss of the uplink IoV message.

3. In some possible scenarios, the vehicle-mounted device may not receive the IoV message sent by the server or the roadside unit, in other words, may not receive the first IoV message. When the first IoV message is not received, the vehicle-mounted device determines that the uplink message sending policy is: separately sending an IoV message to the server and the roadside unit, and indicating the roadside unit to ignore forwarding of the IoV message or indicating the roadside unit to forward the IoV message to the server.

Figure 11E:
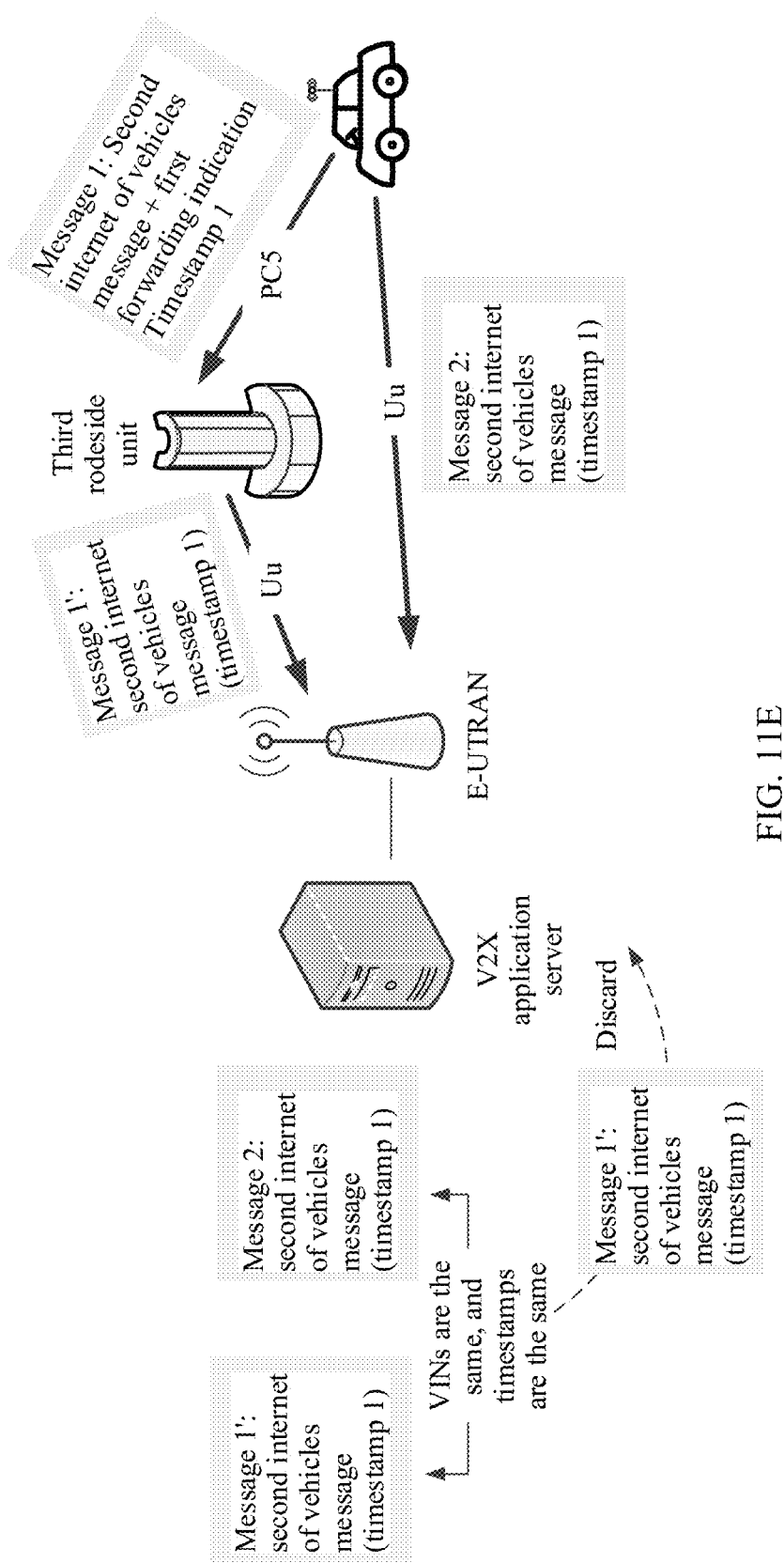
Figure 11F:
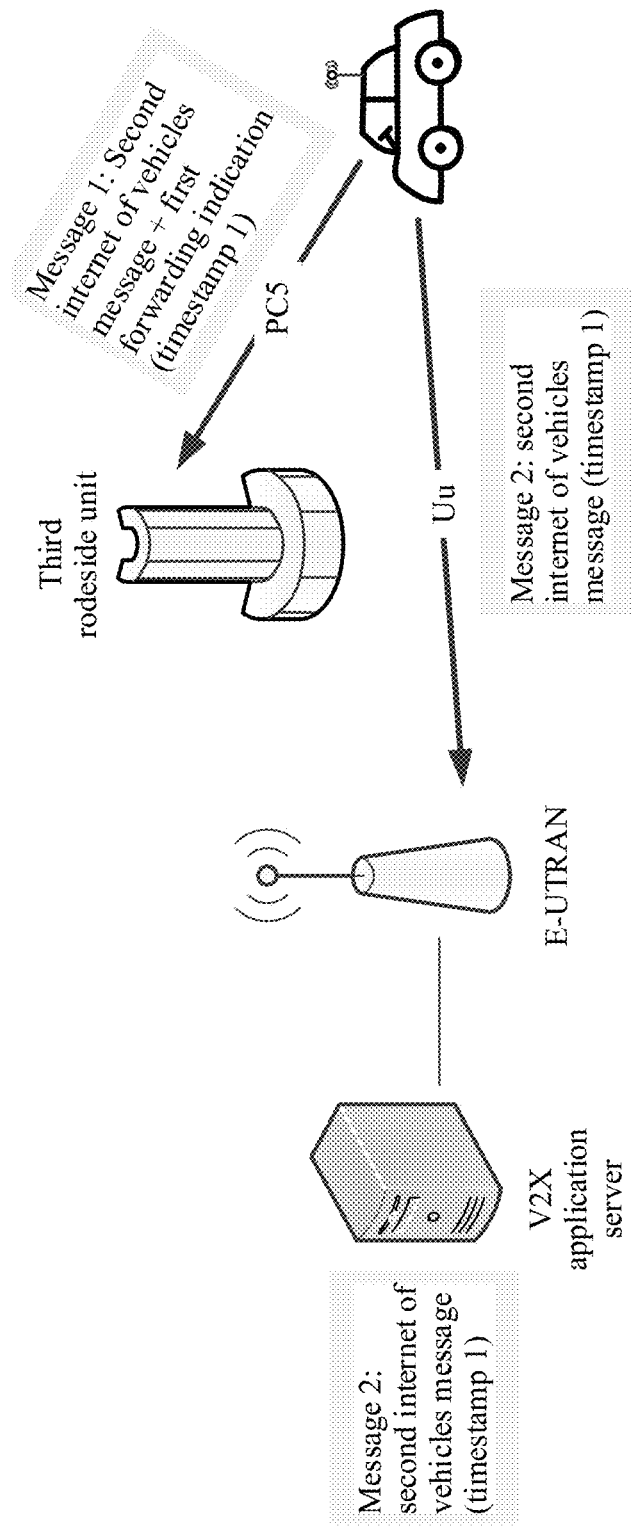

Correspondingly, a schematic diagram in which the vehicle-mounted device sends the second IoV message to the server according to the uplink message sending policy may be shown in FIG. 11E and FIG. 11F. As shown in FIG. 11E, the vehicle-mounted device separately sends the second IoV message to the roadside unit and the server according to the uplink message sending policy, and sends the first forwarding indication to the roadside unit, where the first forwarding indication is used by the roadside unit to forward the second IoV message. After receiving the second IoV message, the roadside unit adds an original timestamp of the second IoV message to the second IoV message based on the first forwarding indication, and then forwards the second IoV message to the server. After receiving the second IoV message, the server identifies, based on a vehicle identification number (VIN) and a timestamp in the second IoV message, whether the second IoV message is received for the first time. If the second IoV message is received for the first time, the server stores the second IoV message. When subsequently receiving a third IoV message whose VIN and timestamp are the same as the VIN and the timestamp of the second IoV message, the server discards the third IoV message. As shown in FIG. 11F, the vehicle-mounted device separately sends the second IoV message to the roadside unit and the server according to the uplink message sending policy, and sends a second forwarding indication to the roadside unit, where the second forwarding indication is used to indicate that the roadside unit ignores forwarding of the second IoV message. After receiving the second IoV message, the roadside unit ignores forwarding of the second IoV message. Because the roadside unit ignores forwarding of the second IoV message, the server receives only one second IoV message.

In the foregoing third uplink message sending policy, the roadside unit is indicated not to forward the uplink IoV message, to avoid repetition of the uplink IoV message. The roadside unit is indicated to forward the uplink IoV message. When forwarding the uplink IoV message, the roadside unit carries the original timestamp of the uplink IoV message, so that the server can perform de-duplication processing on the uplink IoV message based on the VIN and the timestamp in the uplink IoV message, to reduce repetition of the uplink IoV message.

It can be learned from FIG. 11A to FIG. 11F that, compared with a single manner in which the downlink IoV message is sent in FIG. 3D to FIG. 3F, different uplink message sending policies are set and selected based on a case in which the vehicle-mounted device receives the IoV message, to fully utilize the roadside units, and to avoid repetition and loss of the uplink IoV message.

The foregoing describes in detail the IoV message exchange method. To better implement the method, correspondingly, the following provides an apparatus.

Figure 12:
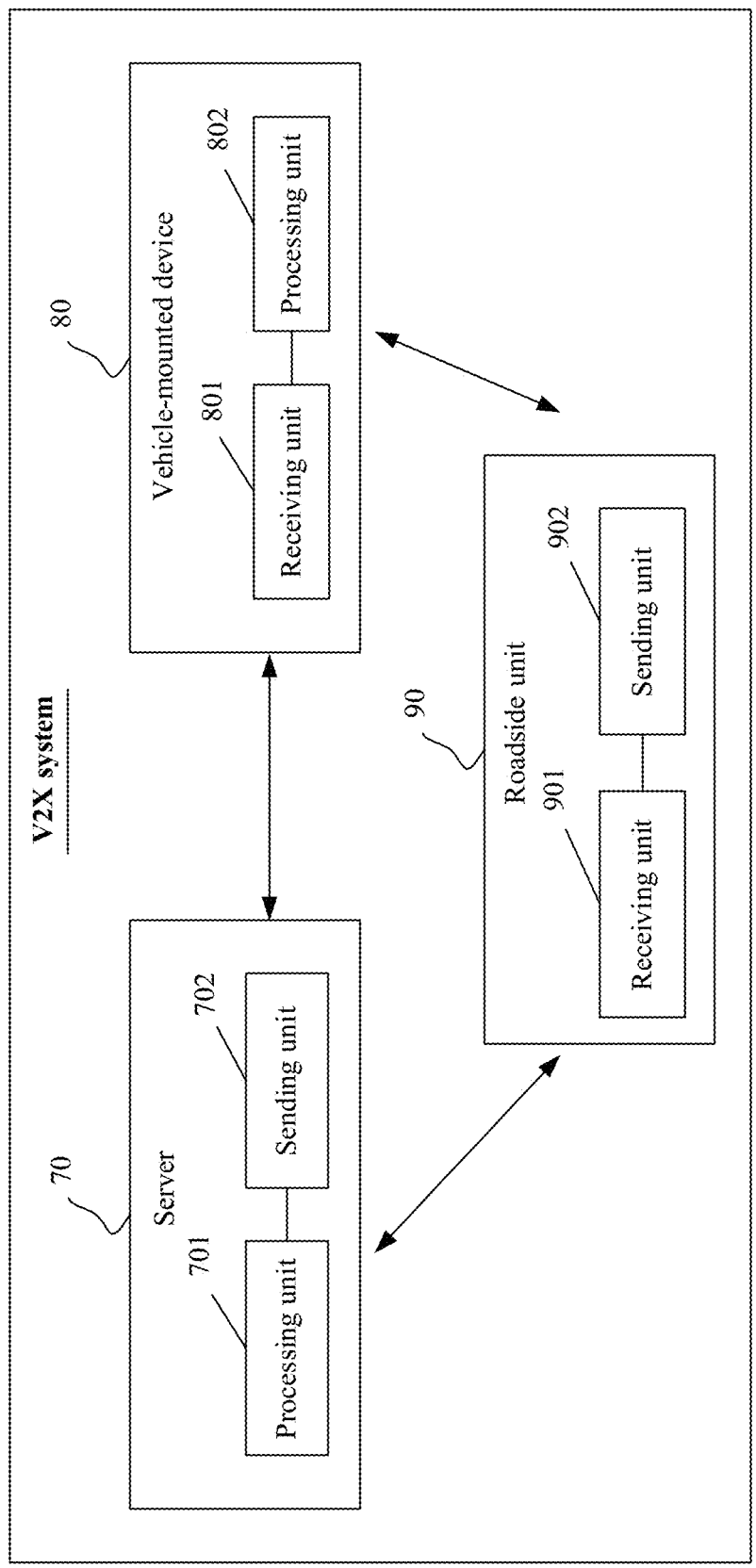
FIG. 12 is a schematic structural diagram of a V2X system, a vehicle-mounted device, a roadside unit, and a server.

FIG. 12 is a schematic structural diagram of a V2X system, a vehicle-mounted device, a roadside unit, and a server. The V2X system may include a server 70, a roadside unit 90, and a vehicle-mounted device 80. The V2X system may be the V2X system shown in FIG. 1. The server 70 may be the V2X AS 101 in the system shown in FIG. 1. The vehicle-mounted device 80 may be the UE 201 in the system shown in FIG. 1. The roadside unit 90 may be the UE 202 in the system shown in FIG. 1.

As shown in FIG. 12, the server 70 may include a processing unit 701 and a sending unit 702.

The processing unit 701 is configured to obtain position information of a first roadside unit, position information of a second roadside unit, and a roadside unit density reference value, where the first roadside unit and the second roadside unit are on a first road section and are two adjacent roadside units, and the first road section is a road section between the first roadside unit and the second roadside unit.

The processing unit 701 is further configured to determine a density of roadside units on the first road section based on the position information of the first roadside unit, the position information of the second roadside unit, and the roadside unit density reference value.

The processing unit 701 is further configured to determine a downlink message sending policy based on the density.

The sending unit 702 is configured to send a first IoV message to a first vehicle-mounted device according to the downlink message sending policy, where the first vehicle-mounted device is a vehicle-mounted device on the first road section.

Herein, for the position information of the first roadside unit, the position information of the second roadside unit, the roadside unit density reference value, and the density of the roadside units on the first road section, refer to the related descriptions in the method embodiment shown in FIG. 8, in other words, refer to the related descriptions corresponding to the foregoing process of sending the downlink IoV message.

The processing unit 701 may be configured to perform the steps S101 to S103 in the method embodiment shown in FIG. 8. The sending unit 702 may be configured to perform the step S104 in the method embodiment shown in FIG. 8. For specific implementations of performing, by the processing unit 701, the foregoing steps S101 to S103 and performing, by the sending unit 702, the foregoing step S104, refer to related descriptions of the method embodiment shown in FIG. 8. Details are not described herein again. Specifically, for sending the first IoV message by the sending unit 702, refer to the manners shown in FIG. 9A to FIG. 9E. For a specific process, refer to the foregoing related descriptions corresponding to FIG. 9A to FIG. 9E.

As shown in FIG. 12, the vehicle-mounted device 80 may include a receiving unit 801 and a processing unit 802.

The receiving unit 801 is configured to receive the first IoV message.

The receiving unit 801 is further configured to receive a second IoV message. A message identifier of the second IoV message is the same as a message identifier of the first IoV message, and a timestamp of the second IoV message is the same as a timestamp of the first IoV message.

The processing unit 802 is configured to discard the second IoV message.

Herein, for the first IoV message and the second IoV message, refer to the first IoV message and the second IoV message in related descriptions corresponding to FIG. 9A to FIG. 9E. The processing unit 802 may process, with reference to the manners shown in FIG. 9A to FIG. 9E, the IoV message received by the vehicle-mounted device 80. For a processing process, refer to related descriptions corresponding to FIG. 9A to FIG. 9E. Details are not described herein again.

As shown in FIG. 12, the roadside unit 90 may include a receiving unit 901 and a sending unit 902.

The receiving unit 901 is configured to receive the first IoV message and a first forwarding indication, or the first IoV message and a second forwarding indication. The second forwarding indication is used to indicate that the roadside unit ignores forwarding of the first IoV message, and the first forwarding indication is used to indicate that the roadside unit forwards the first IoV message.

The sending unit 902 is configured to: ignore forwarding of the first IoV message based on the second forwarding indication, or forward, after adding an original timestamp of the first IoV message to the first IoV message based on the first forwarding indication, the first IoV message carrying the original timestamp.

Herein, for the first IoV message, the first forwarding indication, and the second forwarding indication, refer to the first IoV message, the first forwarding indication, and the second forwarding indication in related descriptions corresponding to FIG. 9A to FIG. 9E. With reference to the manners shown in FIG. 9A to FIG. 9E, the sending unit 902 may forward the IoV message received by the roadside unit 80 or ignore forwarding of the IoV message received by the roadside unit 80. For a specific process, refer to related descriptions corresponding to FIG. 9A to FIG. 9E. Details are not described herein again.

Specifically, a function implemented by the server 70 may be implemented by the V2X server 50 shown in FIG. 5, a function implemented by the roadside unit 80 may be implemented by the roadside unit 60 shown in FIG. 6, and a function implemented by the vehicle-mounted device 90 may be implemented by the vehicle-mounted device 40 shown in FIG. 4. For specific implementations of the function units included on the server 70, the vehicle-mounted device 80, and the roadside unit 90, refer to related descriptions in the foregoing method embodiments shown in FIG. 8 and FIG. 9A to FIG. 9E, in other words, refer to related descriptions corresponding to the foregoing process of sending the downlink IoV message. Details are not described herein again.

Figure 13:
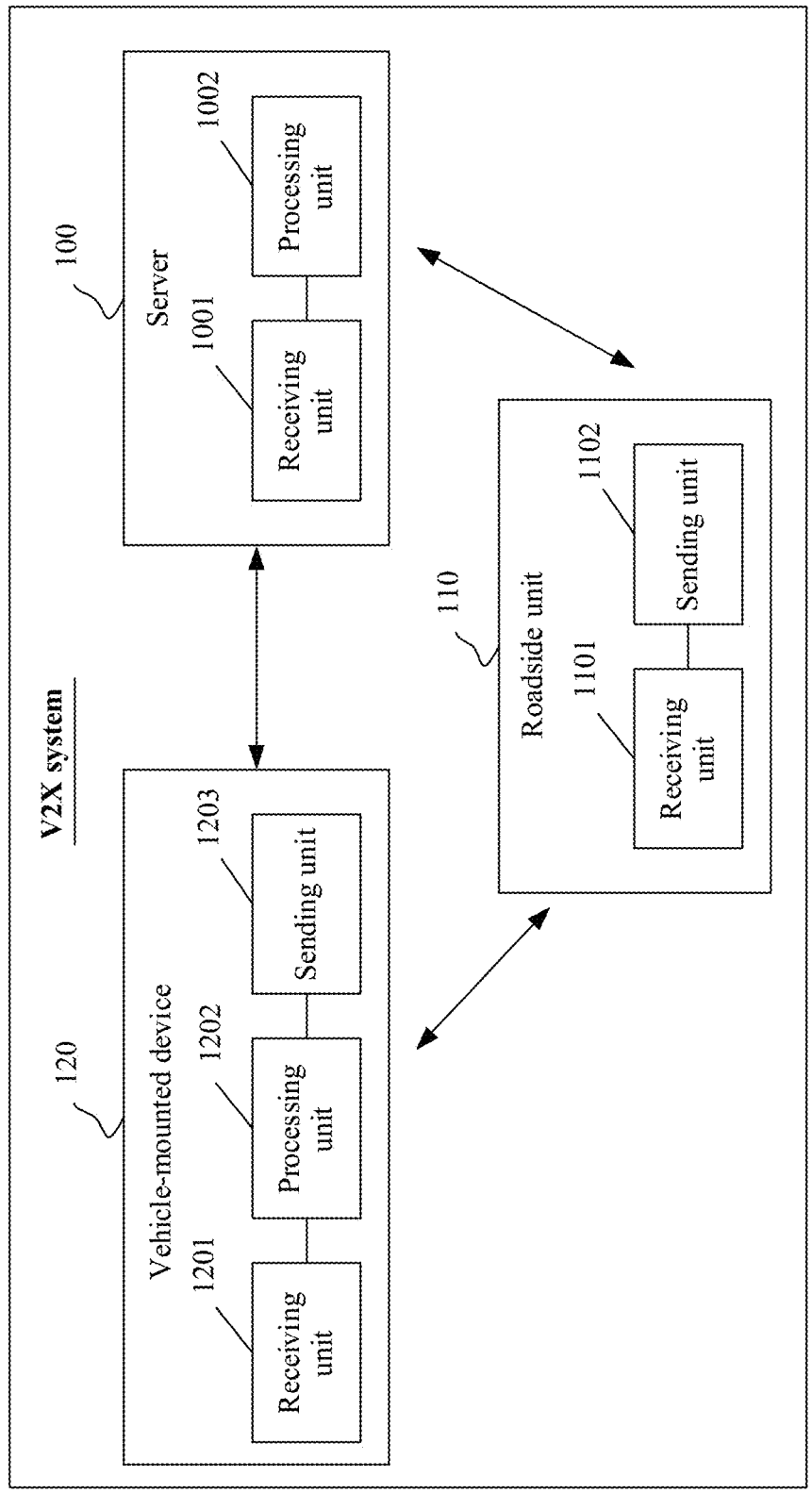
FIG. 13 is a schematic structural diagram of another V2X system, a vehicle-mounted device, a roadside unit, and a server.

FIG. 13 is a schematic structural diagram of another V2X system, a vehicle-mounted device, a roadside unit, and a server. The V2X system may include a server 100, a roadside unit 110, and a vehicle-mounted device 120. The V2X system may be the V2X system shown in FIG. 1. The server 100 may be the V2X AS 101 in the system shown in FIG. 1. The vehicle-mounted device 120 may be the UE 201 in the system shown in FIG. 1. The roadside unit 110 may be the UE 202 in the system shown in FIG. 1.

As shown in FIG. 13, the vehicle-mounted device 120 may include a receiving unit 1201, a processing unit 1202, and a sending unit 1203.

The receiving unit 1201 is configured to receive a first IoV message. A transmit end of the first IoV message is the roadside unit or the server.

The processing unit 1202 is configured to determine an uplink message sending policy based on the first IoV message.

The sending unit 1203 is configured to send a second IoV message to the server according to the uplink message sending policy.

Herein, for the first IoV message and the second IoV message, refer to the first IoV message and the second IoV message in related descriptions corresponding to FIG. 11A to FIG. 11F.

The receiving unit 1201 may be configured to perform the step S201 in the method embodiment shown in FIG. 10, the processing unit 1202 may be configured to perform the step S202 in the method embodiment shown in FIG. 10, and the sending unit 1203 may be configured to perform the step S203 in the method embodiment shown in FIG. 10. For specific implementations in which the receiving unit 1201 performs the step S201, the processing unit 1202 performs the step S202, and the sending unit 1203 performs the step S203, refer to related descriptions in the method embodiment shown in FIG. 10. Details are not described herein again. Specifically, the sending unit 1203 may send the first IoV message with reference to the manners shown in FIG. 11A to FIG. 11F. For a specific process, refer to the foregoing related descriptions corresponding to FIG. 11A to FIG. 11F.

As shown in FIG. 13, the roadside unit 110 may include a receiving unit 1101 and a sending unit 1102.

The receiving unit 1101 is configured to receive the first IoV message and a first forwarding indication, or the first IoV message and a second forwarding indication. The second forwarding indication is used to indicate that the roadside unit ignores forwarding of the first IoV message, and the first forwarding indication is used to indicate that the roadside unit forwards the first IoV message.

The sending unit 1102 is configured to: ignore forwarding of the first IoV message based on the second forwarding indication, or forward, after adding an original timestamp of the first IoV message to the first IoV message based on the first forwarding indication, the first IoV message carrying the original timestamp.

Herein, for the first IoV message, refer to the second IoV message in the related descriptions corresponding to FIG. 11A to FIG. 11F. For the first forwarding indication and the second forwarding indication, refer to the first forwarding indication and the second forwarding indication in the related descriptions corresponding to FIG. 11A to FIG. 11F. The sending unit 1102 may forward, with reference to the manners shown in FIG. 11A to FIG. 11F, the IoV message received by the roadside unit 110 or ignore forwarding of the IoV message received by the roadside unit 110. For a specific process, refer to related descriptions corresponding to FIG. 11A to FIG. 11F. Details are not described herein again.

As shown in FIG. 13, the server 100 may include a receiving unit 1001 and a processing unit 1002.

The receiving unit 1001 is configured to receive the first IoV message.

The receiving unit 1001 is further configured to receive the second IoV message. A vehicle identification number of the second IoV message is the same as a vehicle identification number of the first IoV message, and a timestamp of the second IoV message is the same as a timestamp of the first IoV message.

The processing unit 1002 is configured to discard the second IoV message.

Herein, for the first IoV message, refer to the second IoV message in the related descriptions corresponding to FIG. 11A to FIG. 11F. For the second IoV message, refer to the third IoV message in the related descriptions corresponding to FIG. 11A to FIG. 11F. The processing unit 1002 may process, with reference to the manners shown in FIG. 11A to FIG. 11F, the IoV message received by the server 100. For a processing process, refer to related descriptions corresponding to FIG. 11A to FIG. 11F. Details are not described herein again.

Specifically, a function implemented by the server 100 may be implemented by the V2X server 50 shown in FIG. 5, a function implemented by the roadside unit 110 may be implemented by the roadside unit 60 shown in FIG. 6, and a function implemented by the vehicle-mounted device 120 may be implemented by the vehicle-mounted device 40 shown in FIG. 4. For specific implementation of functional units included in the vehicle-mounted device 120, the roadside unit 110, and the server 100, refer to related descriptions in the foregoing method embodiments shown in FIG. 10 and FIG. 11A to FIG. 11F, in other words, refer to related descriptions corresponding to the foregoing procedure of sending the uplink IoV message. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according are all or partially generated. The computer instruction may be stored in a computer-readable storage medium, or may be transmitted by using the computer-readable storage medium. The computer-readable storage medium may be any usable medium accessible by a computer, or a data storage device, such as a server or a data center, integrating one or more usable media. The usable medium may be a semiconductor medium (for example, a solid-state drive (SSD)), or the like.

A person of ordinary skill in the art may be aware that, in combination with the examples described in the embodiments, modules and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It should be noted that "first", "second", "third", and various numbers in the are merely used for differentiation for ease of description, and are not intended to limit the scope of the embodiments.

The foregoing descriptions are merely specific implementations, but are not intended to limit the protection scope of this disclosure. Any variation or replacement readily figured out by a person skilled in the art within the technical scope disclosed shall fall within the protection scope of this disclosure. Therefore, the protection scope of this disclosure shall be subject to the protection scope of the claims.

What is claimed is:

1. A method implemented by an Internet of vehicles (IoV) message exchange server and comprising:
    obtaining first position information of a first roadside unit (RSU), second position information of a second RSU, and an RSU density reference value, wherein the first RSU and the second RSU are on a first road section and are adjacent to each other, wherein the first road section is between the first RSU and the second RSU, and wherein the RSU density reference value is a safe driving distance;
    determining a density of RSUs on the first road section based on the first position information, the second position information, and the RSU density reference value;
    determining a downlink message sending policy based on the density; and
    sending, according to the downlink message sending policy, a first IoV message to a first vehicle-mounted device on the first road section.

2. The method of claim 1, wherein the density is in a first density range, a second density range, or a third density range, wherein the first density range is higher than the second density range, and wherein the second density range is higher than the third density range.

3. The method of claim 2, wherein when the density is in the first density range, the downlink message sending policy is sending the first IoV message to the first RSU and the second RSU and instructing the first RSU and the second RSU to forward the first IoV message to the first vehicle-mounted device.

4. The method of claim 2, wherein when the density is in the second density range, the downlink message sending policy is:
sending the first IoV message to a first device in a first multicast group and instructing the first RSU and the second RSU to forward the first IoV message to the first vehicle-mounted device, wherein the first multicast group comprises the first RSU, the second RSU, and the first vehicle-mounted device; or
sending the first IoV message to the first vehicle-mounted device, the first RSU, and the second RSU in a unicast mode and instructing the first RSU and the second RSU to forward the first IoV message to the first vehicle-mounted device.

5. The method of claim 2, wherein when the density is in the third density range, the downlink message sending policy is:
sending the first IoV message to the first vehicle-mounted device in a unicast mode;
sending the first IoV message to a second device in a second multicast group, wherein the second multicast group comprises the first vehicle-mounted device and does not comprise the first RSU or the second RSU; or
sending the first IoV message to a first device and instructing the first RSU and the second RSU to skip forwarding the first IoV message, wherein a first multicast group comprises the first RSU, the second RSU, and the first vehicle-mounted device.

6. The method of claim 2, wherein the density is:
in the third density range when determining, based on the first position information and the second position information, that a first distance is greater than the safe driving distance, wherein the first distance is between the first RSU and the second RSU, and wherein the safe driving distance is of a vehicle-mounted device traveling on a road section in an urban area when a vehicle flow of the road section is in an off-peak period;
in the first density range when determining, based on the first position information and the second position information, that the first distance is less than the safe driving distance, wherein the safe driving distance is of a vehicle-mounted device traveling on a high-speed road section when a vehicle flow of the high-speed road section is in an off-peak period; and
in the second density range when determining, based on the first position information and the second position information, that the first distance is greater than or equal to the safe driving distance and is less than or equal to a first safe driving distance.

7. The method of claim 1, wherein the safe driving distance is based on whether the first road section is an urban area, whether a vehicle flow of the first road section is in an off-peak period, and whether the first road section is a high-speed road section.

8. The method of claim 1, wherein the safe driving distance is based on a speed distance between a rear vehicle and a front vehicle, a driver response period, a braking coordination time period, a deceleration increase time period, a maximum deceleration of a vehicle, or a safe distance when the vehicle is stopped.

9. The method of claim 8, wherein the safe distance is 2-5 meters (m).

10. An internet of vehicles (IoV) message exchange server comprising:
a memory configured to store instructions; and
a processor configured to execute the instructions to cause the IoV message exchange server to:
obtain first position information of a first roadside unit (RSU), second position information of a second roadside unit (RSU), and an RSU density reference value, wherein the first RSU and the second RSU are on a first road section and are adjacent to each other, wherein the first road section is between the first RSU and the second RSU, and wherein the RSU density reference value is a safe driving distance;
determine a density of RSUs on the first road section based on the first position information, the second position information, and the RSU density reference value;
determine a downlink message sending policy based on the density; and
send, according to the downlink message sending policy, a first IoV message to a first vehicle-mounted device on the first road section.

11. The message exchange server of claim 10, wherein the density is in a first density range, a second density range, or a third density range, wherein the first density range is higher than the second density range, and wherein the second density range is higher than the third density range.

12. The IoV message exchange server of claim 11, wherein when the density is in the first density range, the downlink message sending policy is sending the first IoV message to the first RSU and the second RSU and instructing the first RSU to forward the first IoV message to the first vehicle-mounted device.

13. The IoV message exchange server of claim 11, wherein when the density is in the second density range, the downlink message sending policy is:
sending the first IoV message to a first device in a first multicast group and instructing the first RSU and the second RSU to forward the first IoV message to the first vehicle-mounted device, wherein the first multicast group comprises the first RSU, the second RSU, and the first vehicle-mounted device; or
sending the first IoV message to the first vehicle-mounted device, the first RSU, and the second RSU in a unicast mode and instructing the first RSU and the second RSU to forward the first IoV message to the first vehicle-mounted device.

14. The IoV message exchange server of claim 11, wherein when the density is in the third density range, the downlink message sending policy is:
sending the first IoV message to the first vehicle-mounted device in a unicast mode;
sending the first IoV message to a second device in a second multicast group, wherein the second multicast group comprises the first vehicle-mounted device and does not comprise the first RSU or the second RSU; or
sending the first IoV message to a first device and instructing the first RSU and the second RSU to skip forwarding the first IoV message, wherein a first multicast group comprises the first RSU, the second RSU, and the first vehicle-mounted device.

15. The IoV message exchange server of claim 11, wherein the density is:
in the third density range when the processor executes the instructions to cause the IoV message exchange server to determine, based on the first position information and the second position information, that a first distance is greater than the safe driving distance, wherein the first distance is between the first RSU and the second RSU, and wherein the safe driving distance is of a vehicle-mounted device traveling on a road section in an urban area when a vehicle flow of the road section is in an off-peak period;

in the first density range when the processor executes the instructions to cause the IoV message exchange server to determine, based on the first position information and the second position information, that the first distance is less than the safe driving distance, wherein the safe driving distance is of a vehicle-mounted device traveling on a high-speed road section when a vehicle flow of the high-speed road section is in an off-peak period; and in the second density range when the processor executes the instructions to cause the toy message exchange server to determine, based on the first position information and the second position information, that the first distance is greater than or equal to the safe driving distance and is less than or equal to a first safe driving distance.

16. A computer program product comprising instructions that are stored on a non-transitory computer-readable medium and that, when executed by a processor, cause an internet of vehicles (IoV) message exchange server to:

obtain first position information of a first roadside unit (RSU), second position information of a second roadside unit (RSU), and an RSU density reference value, wherein the first RSU and the second RSU are on a first road section and are adjacent to each other, wherein the first road section is between the first RSU and the second RSU, and wherein the RSU density reference value is a safe driving distance;

determine a density of RSUs on the first road section based on the first position information, the second position information, and the RSU density reference value;

determine a downlink message sending policy based on the density; and send, according to the downlink message sending policy, a first IoV message to a first vehicle-mounted device on the first road section.

17. The computer program product of claim 16, wherein the density is in a first density range, a second density range, or a third density range, wherein the first density range is higher than the second density range, and wherein the second density range is higher than the third density range.

18. The computer program product of claim 17, wherein when the density is in the first density range, the downlink message sending policy is sending the first IoV message to the first RSU and the second RSU and instructing the first RSU to forward the first IoV message to the first vehicle-mounted device.

19. The computer program product of claim 17, wherein when the density is in the second density range, the downlink message sending policy is:

sending the first IoV message to a first device in a first multicast group and instructing the first RSU and the second RSU to forward the first IoV message to the first vehicle-mounted device, wherein the first multicast group comprises the first RSU, the second RSU, and the first vehicle-mounted device; or sending the first IoV message to the first vehicle-mounted device, the first RSU, and the second RSU in a unicast mode and instructing the first RSU and the second RSU to forward the first IoV message to the first vehicle-mounted device.

20. The computer program product of claim 17, wherein when the density is in the third density range, the downlink message sending policy is:

sending the first IoV message to the first vehicle-mounted device in a unicast mode;

sending the first IoV message to a second device in a second multicast group, wherein the second multicast group comprises the first vehicle-mounted device and does not comprise the first RSU or the second RSU; or sending the first IoV message to a first device and instructing the first RSU and the second RSU to skip forwarding the first IoV message, wherein a first multicast group comprises the first RSU, the second RSU, and the first vehicle-mounted device.

21. The computer program product of claim 17, wherein the density is:

in the third density range when the instructions, when executed by the processor, further cause the IoV message exchange server to determine, based on the first position information and the second position information, that a first distance is greater than the safe driving distance, wherein the first distance is between the first RSU and the second RSU, and wherein the safe driving distance is of a vehicle-mounted device traveling on a road section in an urban area when a vehicle flow of the road section is in an off-peak period;

in the first density range when the instructions, when executed by the processor, further cause the IoV message exchange server to determine, based on the first position information and the second position information, that the first distance is less than the safe driving distance, wherein the safe driving distance is of a vehicle-mounted device traveling on a high-speed road section when a vehicle flow of the high-speed road section is in an off-peak period; and in the second density range when the instructions, when executed by the processor, further cause the IoV message exchange server to determine, based on the first position information and the second position information, that the first distance is greater than or equal to the safe driving distance and is less than or equal to a first safe driving distance.

* * * * *

UNITED STATES PATENT AND TRADEMARK OFFICE
CERTIFICATE OF CORRECTION

PATENT NO. : 11,600,172 B2
APPLICATION NO. : 17/216074
DATED : March 7, 2023
INVENTOR(S) : Yan Liu and Kai Zhou It is certified that error appears in the above-identified patent and that said Letters Patent is hereby corrected as shown below:

In the Claims

Claim 15, Column 37, Line 20: "the toy message" should read "the IoV message"

Signed and Sealed this
Second Day of May, 2023

Katherine Kelly Vidal
*Director of the United States Patent and Trademark Office*